(12) United States Patent
Gindele et al.

(10) Patent No.: US 6,937,775 B2
(45) Date of Patent: Aug. 30, 2005

(54) METHOD OF ENHANCING THE TONE SCALE OF A DIGITAL IMAGE TO EXTEND THE LINEAR RESPONSE RANGE WITHOUT AMPLIFYING NOISE

(75) Inventors: Edward B. Gindele, Rochester, NY (US); Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 644 days.

(21) Appl. No.: 10/145,937

(22) Filed: May 15, 2002

(65) Prior Publication Data

US 2003/0215153 A1 Nov. 20, 2003

(51) Int. Cl.[7] .................................................. G06K 9/40
(52) U.S. Cl. ........................ 382/254; 382/260; 382/274; 382/275; 382/284; 358/3.26; 358/3.27
(58) Field of Search ................................ 382/167, 260, 382/265, 274, 275, 284; 358/1.2, 3.26, 3.27, 520, 540, 450, 463

(56) References Cited

U.S. PATENT DOCUMENTS

| | | | |
|---|---|---|---|
| 4,402,015 A | | 8/1983 | Yamada |
| 4,816,863 A | | 3/1989 | Lee |
| 4,974,017 A | | 11/1990 | Terashita |
| 5,012,333 A | | 4/1991 | Lee et al. |
| 5,134,573 A | * | 7/1992 | Goodwin ..................... 382/141 |
| 5,454,044 A | | 9/1995 | Nakajima |
| 5,461,655 A | | 10/1995 | Vuylsteke et al. |
| 5,467,404 A | | 11/1995 | Vuylsteke et al. |
| 5,526,446 A | | 6/1996 | Adelson et al. |
| 5,724,456 A | * | 3/1998 | Boyack et al. .............. 382/274 |
| 5,729,631 A | | 3/1998 | Wober et al. |
| 5,805,721 A | | 9/1998 | Vuylsteke et al. |
| 5,907,642 A | | 5/1999 | Ito |
| 5,960,123 A | | 9/1999 | Ito |
| 5,991,457 A | | 11/1999 | Ito et al. |
| 6,148,103 A | * | 11/2000 | Nenonen ..................... 382/169 |
| 6,600,833 B1 | * | 7/2003 | Tan et al. ..................... 382/167 |
| 6,813,389 B1 | * | 11/2004 | Gindele et al. .............. 382/274 |

OTHER PUBLICATIONS

Burt et al., The Laplacian Pyramid as a Compact Image Code, *IEEE Transactions on Communications*, vol. COM-31, No. 4, Apr. 1983, pp. 532–540.
Lee, J., Digital Image Smoothing and the Sigma Filter, *Computer Vision, Graphics, and Image Processing* 24, 1983, pp. 255–269.
Press et al., Numerical Recipes, *The Art of Scientific Computing*, Cambridge University Press, pp. 98–101.
U.S. Appl. No. 09/413,398, filed Oct. 6, 1999, Gindele.
U.S. Appl. No. 09/742,957, filed Dec. 20, 2000, Gindele.

* cited by examiner

*Primary Examiner*—Bhavesh Mehta
*Assistant Examiner*—Yosef Kassa
(74) *Attorney, Agent, or Firm*—Thomas H. Close

(57) ABSTRACT

A method of processing a digital image to improve contrast, the digital image being derived from an image captured by a recording medium having a nonlinear response to light, includes the steps of: applying a spatial filter to the digital image to produce a noise reduced digital image; subtracting the noise reduced digital image from the digital image to produce a difference digital image; applying a tone scale function to the noise reduced digital image to produce a tone scale adjusted digital image having the appearance of being derived from an image captured by a recording medium having a linear response; and combining the difference digital image with the tone scale adjusted digital image to produce a processed digital image, whereby the contrast of the digital image is improved without amplifying noise.

28 Claims, 16 Drawing Sheets

METHOD OF ENHANCING THE TONE SCALE OF A DIGITAL IMAGE TO EXTEND THE LINEAR RESPONSE RANGE WITHOUT AMPLIFYING NOISE

FIELD OF INVENTION

The present invention relates to digital image processing and more particularly to processing a digital image to provide filtered digital images with reduced noise.

BACKGROUND OF THE INVENTION

In commonly assigned U.S. Pat. No. 5,134,573, Goodwin discloses a method for adjusting the tone scale for digitally scanned photographic film systems. This method improves the overall image contrast of the processed digital images through the application of a tone scale function designed to linearize the photographic response of conventional photographic film products. Presented by Goodwin in this patent is a mathematical formula for constructing a tone scale function which relies on several control parameters. The mathematical formula was designed to accommodate a generalized photographic film product. The control parameters must be set according to the film response characteristics for a given photographic film product to achieve optimal results. One of the control parameters discussed is sensitive to the level of noise present in the digital image. This is important to Goodwin's method due to the fact that calculated tone scale function has a slope that is greater than unity. Therefore, applying tone scale function will, in general, amplify the noise of the resultant processed digital image. Goodwin describes how to optimize this control parameter to minimize the adverse effects of the noise amplification.

In U.S. Pat. No. 4,974,017, Terashita discloses a printing exposure method which measures and utilizes a method for measuring the photographic response to light characteristics of color negative photographic film products. This method calculates, for a particular film, a gradient value for an underexposure portion and a gradient value of an overexposure portion of the film's exposure range. The method disclosed by Terashita is designed to work for optical printing devices and the method as disclosed cannot be used to directly enhance the appearance of digital images derived from color negative photographic film products.

In U.S. Pat. No. 4,816,863, Lee discloses a method of generating an exposure dependent look-up-table for electrophotographic systems. The look-up-table generation method disclosed uses a series of step wedges (uniform patches of reflective targets) to characterize the response of the electrophotographic system. This exposure dependent look-up-table is then used to modify the digital signal prior to exposing the electrophotographic film and linearizes the effective response of the electrophotographic system. However, the method disclosed by Lee also amplifies the noise in the digital signal corresponding to portions of the response range for which the look-up-table has a slope greater than one.

There are many methods design to remove noise from digital images, however, most methods make use of spatial filtering techniques. One class of noise reduction spatial filters employs a non-linear localized spatial filtering technique directly to a digital image. An example of such a noise reduction filter is the Sigma Filter, described by Jong Sen Lee in the journal article *Digital Image Smoothing and the Sigma Filter*, Computer Vision, Graphics, and Image Processing Vol. 24, p. 255–269, 1983. This noise reduction filter uses a non-linear pixel averaging technique sampled from a rectangular window about the center pixel. Pixels in a local neighborhood about the center pixel are either included or excluded from the numerical averaging process on the basis of the difference between the local pixel and the center pixel. The small local neighborhood of pixels used by the Sigma filter make it simple to implement and effective at removing the high spatial frequency components of noise.

Gaussian noise sources exhibit random noise fluctuations over a large range of spatial frequencies. Although the Sigma filter was designed to work with Gaussian noise sources, the Sigma filter generally only removes the highest spatial frequency components of noise and thus has difficulty removing the low spatial frequency components of noise. This is largely due to the fact that the Sigma Filter operates on a small local neighborhood of pixels. Therefore, lower spatial frequency components of noise are not removed. The resultant processed digital images with the Sigma filter can have a mottled appearance particularly for sky regions of images that have little image structure.

Multiresolution, or pyramid, methods as a means of representing images as a function of spatial resolution for image processing as a long history. Burt and Adelson, described a method of representing a digital image by a series of residual images and a base digital image in their journal article "The Laplacian Pyramid as a Compact Image Code" IEEE Transactions on Communications, Vol. Com-31, No. 4, April 1983. Although the method taught by Burt and Adelson was designed with image compression methods in mind, the spatial frequency representation has application for noise reduction filtering methods.

The wavelet spatial frequency decomposition method has also been employed for the use of removing noise from digital images. In U.S. Pat. No. 5,526,446, Adelson et al. disclose a technique which converts an image into a set of coefficients in a multi-scale image decomposition process followed by the modification of each coefficient based on its value and the value of coefficients of related orientation, position, or scale. While the method disclosed by Adelson et al. is capable of removing noise of low and high spatial frequency, their method must be applied to the set of multi-scale coefficients and cannot be directly applied to a digital image.

Noise in digital images is generally exhibited throughout a range of spatial frequencies. The Sigma filter can be used to remove only the highest spatial frequency components of noise. The methods disclosed by Wober et al. and Adelson et al. can be used to remove the low and high spatial frequency components of noise. However, the class of simple spatial noise filters, such as the Sigma filter, can be applied directly to a digital image while the spatial frequency pyramid-based methods must employ noise filters designed to work with residual images.

The above mentioned methods disclosed by Adelson et al, Wober et al, and Jong Sen Lee can be used to remove noise from digital images in the same system that employs the tone scale function disclosed by Goodwin, to enhance the appearance of digital images. However, independent of whether a noise reduction algorithm is applied before or after the application of Goodwin's tone scale function, some noise amplification will result from the application of Goodwin's tone scale function.

In U.S. Pat. No. 5,012,333, Lee et al. disclose a method for preserving the high frequency detail of an image when applying a tone scale function to a digital image. The method disclosed by Lee et al. includes transforming a color digital image into a luminance chrominance representation, blurring the image luminance component with a low-pass spatial filter, subtracting the low-pass signal from the image luminance channel to produce a high-pass signal. The tone scale function is then applied to the low-pass signal and the high-pass signal is added to this result to produce an enhanced digital image. The method disclosed by Lee et al. has been designed to work with tone scale functions constructed to reduce the overall scene dynamic range. As such, the method disclosed by Lee et al. was not designed to work with the contrast expanding types of tone scale functions produced with Goodwin in U.S. Pat. No. 5,134,573. Similarly, U.S. Pat. Nos. 5,454,044, 5,467,404, 5,805,721, and 5,907,642 each disclose a method of spatially filtering digital images for the purposes of applying a tone scale function for the purposes of reducing the effective dynamic range of high dynamic range digital images. As with the method disclosed by Lee et al., these methods are designed to work with contrast reducing tone scale functions.

ADVANTAGES

The present invention corrects for the non-linear photo response characteristics associated with the digital image recording medium and corrects for contrast problems associated with under-exposure pixels. The present invention makes use of a spatial filter in the process of enhancing the contrast of a digital image such that noise is not amplified.

SUMMARY OF THE INVENTION

The need is met according to the present invention by providing a method of processing a digital image to improve contrast, the digital image being derived from an image captured by a recording medium having a nonlinear response to light, that includes the steps of: applying a spatial filter to the digital image to produce a noise reduced digital image; subtracting the noise reduced digital image from the digital image to produce a difference digital image; applying a tone scale function to the noise reduced digital image to produce a tone scale adjusted digital image having the appearance of being derived from an image captured by a recording medium having a linear response; and combining the difference digital image with the tone scale adjusted digital image to produce a processed digital image, whereby the contrast of the digital image is improved without amplifying noise.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
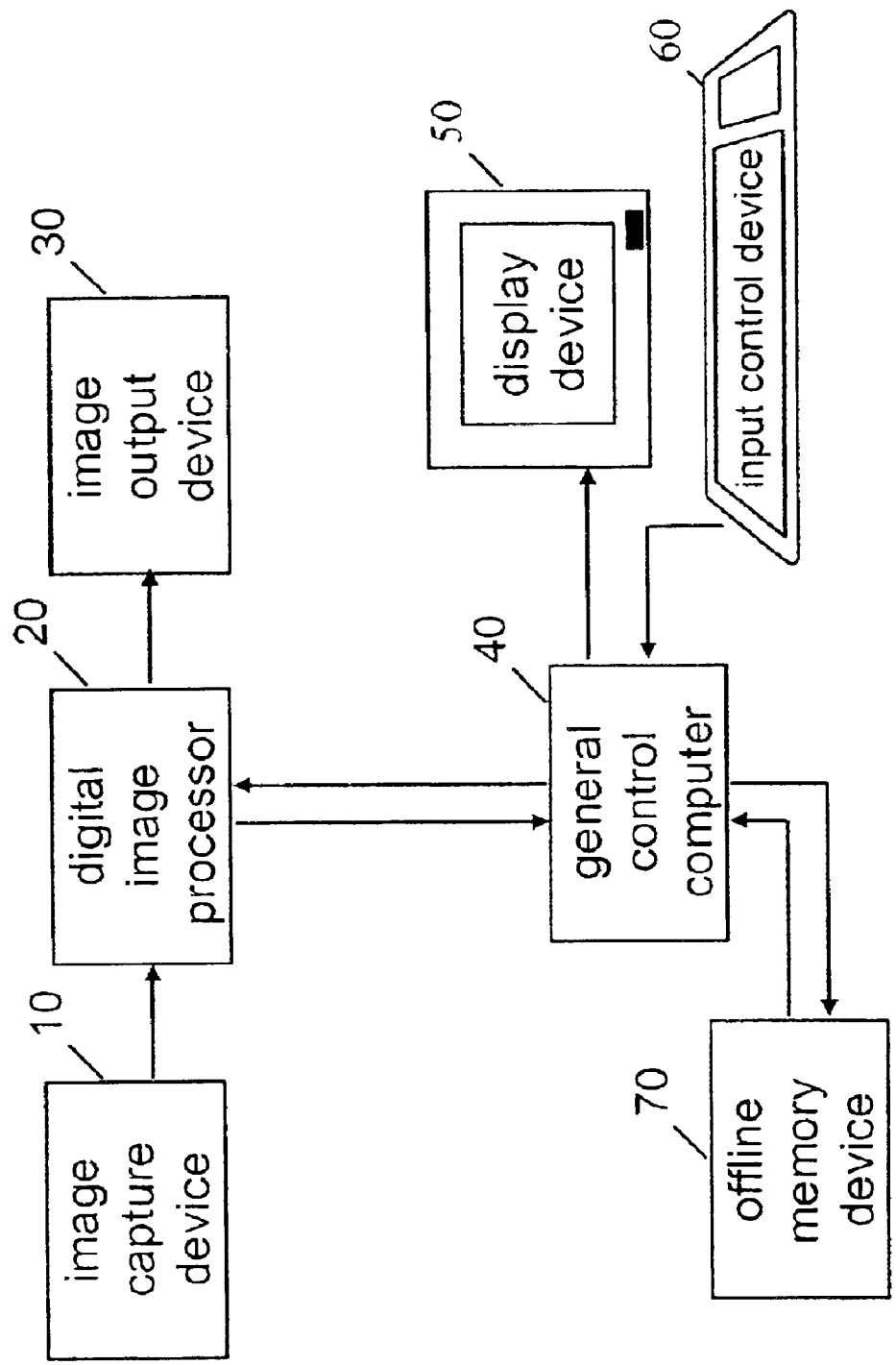
FIG. 1 is a functional block diagram of a computer system suitable for practicing the present invention.

The present invention may be implemented in computer hardware. Referring to FIG. 1, the following description relates to a digital imaging system which includes an image capture device 10, an digital image processor 20, an image output device 30, and a general control computer 40. The system can include a display device 50 such as a computer console or paper printer. The system can also include an input control device 60 for an operator such as a keyboard and or mouse pointer. The present invention can be used multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 which may include, but is not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices that are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. For monochrome applications, the digital image will only contain one digital image channel. Motion imaging applications can be thought of as a sequence of digital images. Those skilled in the art will recognize that the present invention can be applied to, but is not limited to, a digital image channel for any of the above mentioned applications. Although the present invention describes a digital image channel as a two dimensional array of pixels values arranged by rows and columns, those skilled in the art will recognize that the present invention can be applied to mosaic (non rectilinear) arrays with equal effect. Those skilled in the art will also recognize that although the present invention describes replacing original pixel values with processed pixel values, it is also trivial to form a new digital image with the processed pixel values and retain the original pixel values in tact.

Figure 2:
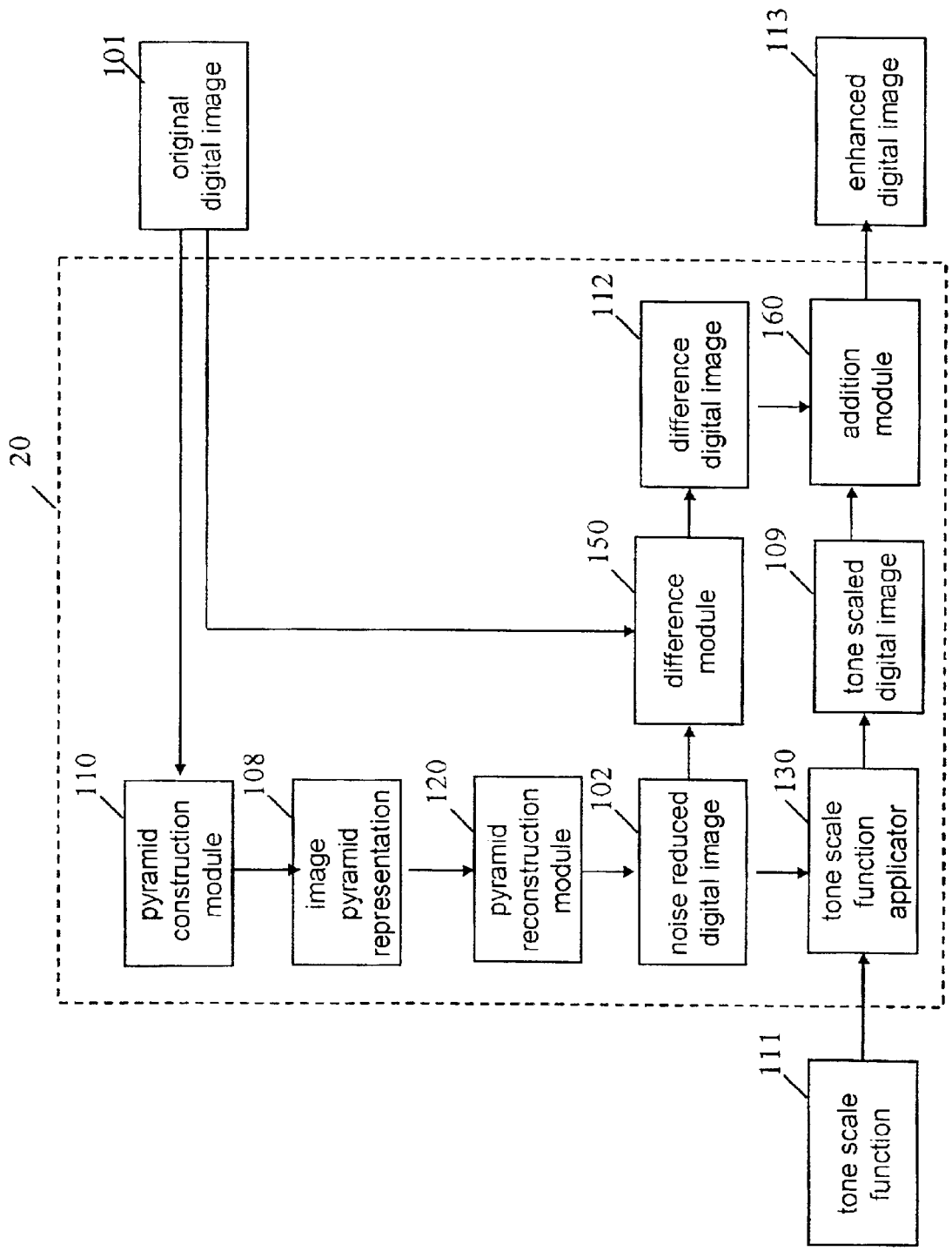
FIG. 2 is a functional block diagram of the digital image processor of FIG. 1.

The digital image processor 20 shown in FIG. 1 is illustrated in more detail in FIG. 2. The pyramid construction module 110 receives an original digital image 101 from the image capture device (shown in FIG. 1) and generates an image pyramid representation 108 of the original digital image 101, i.e. a hierarchical multiresolution representation including a plurality of base digital images and a plurality of residual digital images wherein the base and residual digital image are generated in sequence. Each base digital image is a lower spatial resolution version of the original digital image 101, each base digital image having a different spatial resolution. Each base digital image contains the same image scene content but represents the image scene content with fewer pixels than the original digital image. Since each base digital image in the image pyramid representation has the same scene content as the original digital image 101, the base digital images can be viewed on the display device and will look like the original digital image 101. Therefore, since the base digital image and the original digital image 101 have the same form, the original digital image can also be considered a base digital image, i.e. the base digital image of the image pyramid representation with the highest spatial resolution. The plurality of residual digital images collectively contain the high spatial frequency detail of original digital image 101. Each residual digital image has a different spatial resolution and each contains spatial detail relating to a different pass-band of spatial frequencies. Since the residual digital images have a different form than the original digital image 101, the residual digital images look more like a combination of noise, texture, and edge information when viewed on a display device. The image pyramid representation 108 is received by the pyramid reconstruction module 120 which removes noise from the base digital images of the image pyramid representation 108 pixel data as a step of the image reconstruction process. The processed base digital images are recombined with the residual digital images. The output of the pyramid reconstruction module 120 is a reconstructed digital image called the noise reduced digital image 102. The noise reduced digital image 102 produced by the pyramid reconstruction module 120 has the same, or nearly the same, spatial resolution as the original digital image 101 but contains less noise than the original digital image 101.

The original digital image 101 can be a monochrome digital image having only one digital image channel or a color digital image having two or more digital image channels. The present invention is most commonly practiced with color digital images having three digital image channels—a red, green, and blue digital image channel. For a color digital image, the image pyramid representation 108 is calculated for each digital image channel independently.

The noise reduced digital image 102 and the original digital image 101 are received by the difference module 150 which subtracts, on a pixel by pixel basis, the pixel values of the noise reduced digital image 102 from the pixel values of the original digital image 101 to form a difference digital image 112. Since the noise reduced digital image 102 contains less noise that the original digital image 101, the difference digital image 112 contains mostly noise content and some signal content. The tone scale function applicator 130 receives a tone scale function 111 and the noise reduced digital image 102 and applies the tone scale function 111 to the pixels of the noise reduced digital image 102 to form the tone scale adjusted digital image 109. This tone scale adjusted digital image 109 experiences the tone scale enhancement imparted by the tone scale function 111 but lacks some signal content that is present in the difference digital image 112. The addition module 160 receives both the tone scale adjusted digital image 109 and the difference digital image 112 and adds, on a pixel by pixel basis, the pixel values of the tone scale adjusted digital image 109 and the difference digital image 112 to form the enhanced digital image 113. Thus it will be appreciated that the signal content that was not present in the tone scale adjusted digital image 109 has been restored with the addition of the difference digital image 112.

The tone scale function 111 is a single valued function, i.e. one value is produced for each unique input value. The domain of the tone scale function spans the numerical range of pixel values in the noise reduced digital image 102. Thus for each possible pixel value expressed in the noise reduced digital image 102 there is a corresponding output pixel value as defined by the tone scale function 111. The present invention uses a look-up-table (LUT) to implement the tone scale function 111. The present invention is most applicable for processing digital images that are derived from an original image captured by a recording medium having a nonlinear response to light. Thus the tone scale functions employed by the present invention relate to the sensitometric response function of photographic sensor, or recording medium, used to record an original image from which the original digital image 101 is derived. In particular, the tone scale function 111 is calculated as the mathematical inverse of the sensitometric response function of the photographic sensor. In general, the sensitometric response function of the photographic sensor is a non-linear function with respect to light intensity. Therefore it will be appreciated by those skilled in the art that the application of a tone scale function 111 designed as the mathematical inverse of the sensitometric response function of the photographic sensor will result in enhanced digital images that approximate digital images produced by an ideal photographic sensor. Thus the application of the tone scale function to the original digital image has the effect of producing a processed digital image that has the appearance of being derived from an original image captured by a recording medium having a linear response to light. The tone scale function 111 can be directly applied to the original digital image 101. However, the processed digital images will contain more noise than those processed with the present invention. The present invention produces processed digital images having improved contrast without amplifying the noise. The present invention uses the method disclosed by Goodwin in U.S. Pat. No. 5,134,573 to generate a tone scale function as the mathematical inverse of the response to light function of photographic film and is described in more detail hereinbelow.

The present invention can also be used with other types of tone scale functions. In particular, the present invention is useful when used with tone scale functions that impart an increase in the contrast of the processed digital images relative to the contrast of the original digital image 101. Similarly, for such tone scale functions, the direct application of the tone scale function 111 to the original digital image 101 would result in an amplification of the noise present in the original digital image. Instead, the present invention produces a noise reduced digital image 102 from the original digital image wherein the noise reduced digital image 102 contains less noise than the original digital image 101. By first removing the noise from the original digital image 101 and then subsequently applying the tone scale function 111 to the noise reduced digital image 102, the resultant tone scale adjusted digital image 109 will have the desired enhanced tone scale imparted by the tone scale function 111 without amplifying the noise. Thus the tone scale adjusted digital image 109 can also be considered an enhanced version of the original digital image 101.

The present invention achieves a greater degree of image enhancement by coordinating the degree of noise removal performed by the pyramid reconstruction module 120 with the step of adding the difference digital image 112 with the tone scale adjusted digital image 109. It may appear counter intuitive to first remove noise from an image and then later add it back. However, since no noise reduction filter is perfect, the difference digital image 112 can contain some image signal, i.e. image structure that positively contributes to the enhancement of the processed digital image and the noise reduced digital image 102 can contain some unwanted noise. Therefore, the application of the tone scale function 111 to the noise reduced digital image 102 can amplify what noise is still present in the noise reduced digital image 102.

To minimize the unwanted amplification of noise, the present invention controls the noise removal process to aggressively remove nearly all the noise from the original digital image 101. This is achieved by a careful tuning of the noise reduction filter used to remove the noise and is described in more detail hereinbelow. When nearly all the noise is removed from the original digital image 101, the noise reduced digital image 102 contains nearly no noise. The resulting tone scale adjusted digital image 109 experiences the enhancement of tone scale without any appreciable amplification of noise. As stated above, since no noise reduction filter is perfect, the difference digital image 112 will contain some image signal content. Thus the resulting tone scale adjusted digital image 109 lacks the signal content that has been transferred to the difference digital image 112. By adding the difference digital image 112 to the tone scale adjusted digital image 109 this missing image signal content is restored to the enhanced digital image 113.

It should be noted that the noise present in the original digital image 101 is also restored to the enhanced digital image 113. However, the noise content present in the enhanced digital image 113 is almost of the same magnitude as the noise content present in the original digital image 101. Thus the present invention achieves the goal of enhancing the tone scale of the original digital image 101 without amplifying the magnitude of noise. Experimentation with a variety of different tone scale functions and an optimization of the noise removal method has shown that the optimum image quality of the enhanced digital image 113 is superior to the optimum image quality of the tone scale adjusted digital image 109. In other words, the method employed by the present of invention of first removing noise, applying a tone scale function, and adding the noise back, yields processed digital images of superior image quality than removing noise and subsequently applying the same scale function. This is especially true for tone scale functions that have, for part of the function domain, a high instantaneous slope.

In an alternative embodiment of the present invention, the addition module 160 adds a portion of the difference digital image 112 to the tone scale adjusted digital image 109. A noise scaling factor $S_C$ is set as an application specific parameter. By varying the noise scaling factor, the amount of noise present in the enhanced digital image 113 is controlled. Therefore, for this alternative embodiment of the present invention the operation of scaling the difference digital image 112 by a constant ($S_C$) and adding the scaled difference digital image to the tone scale adjusted digital image 109 achieves both a tone scale enhancement as well as a noise reduction enhancement.

Figure 3:
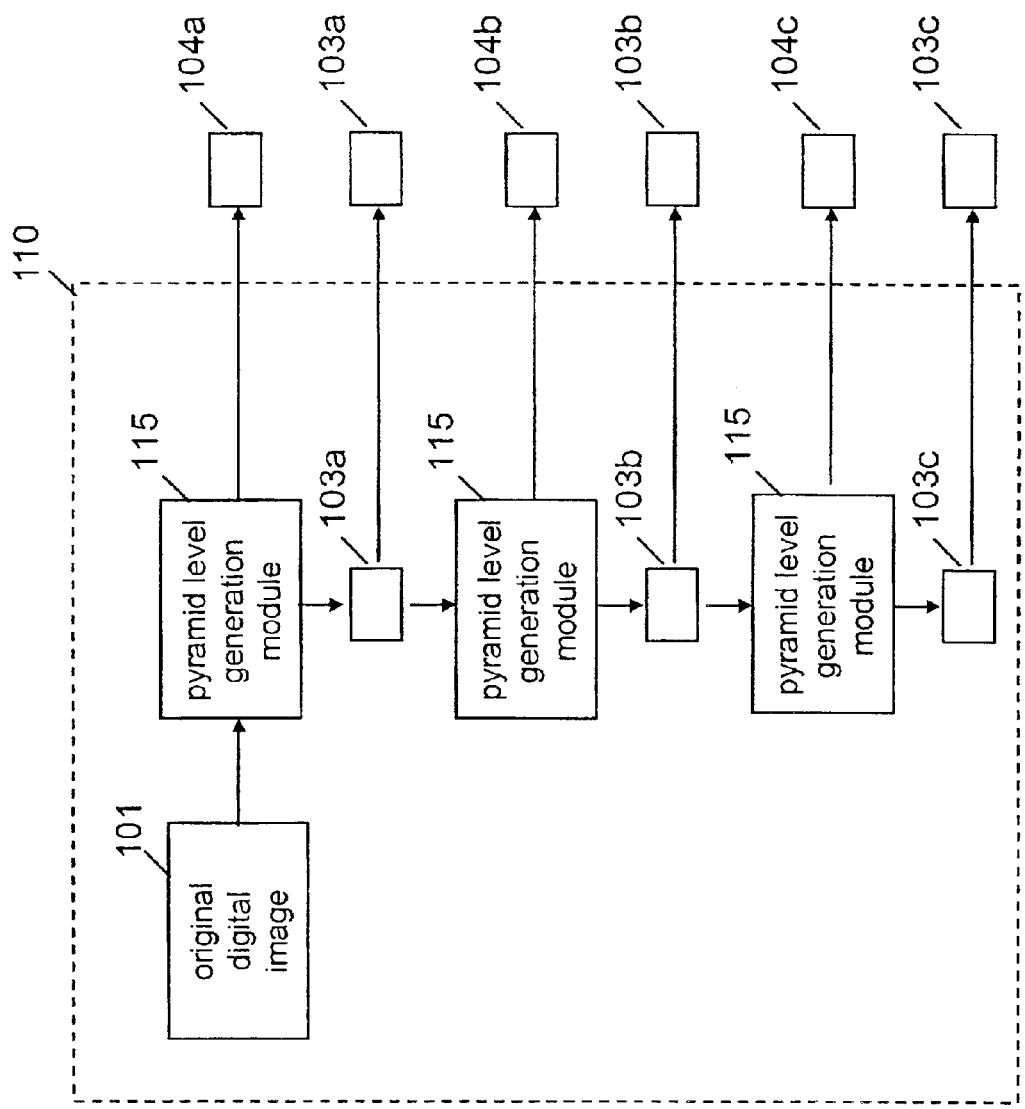
FIG. 3 is a functional block diagram showing in more detail the pyramid construction module of FIG. 2.

The pyramid construction module 110 shown in FIG. 2 is illustrated in more detail in FIG. 3. While the present invention can be used with a variety of image pyramid representations, image pyramid representations can be illustrated with the functional block diagram shown in FIG. 3. The image pyramid representation is generated by successively applying pyramid level generation module 115 to a base digital image. The original digital image 101 can be considered a base digital image, i.e. the base digital image with the highest spatial resolution. The pyramid level generation module 115 receives the original digital image 101 as the starting input base digital image, applies a series of spatial filters to the input base digital image and generates an output base digital image. With the first application of the pyramid level generation module 115 base digital image 103a and residual digital image 104a are generated. The second application of the pyramid level generation module 115 uses the base digital image 103a as the input base digital image and generates a base digital image 103b and a residual digital image 104b. The third application of the pyramid level generation module 115 uses the base digital image 103b as the input base digital image and generates a base digital image 103c and a residual digital image 104c. Thus the image pyramid representation 108 is formed from the plurality of base digital images (103a, 103b, and 103c) and the plurality of residual digital images (104a, 104b, and 104c). Although an image pyramid representation is illustrated in FIG. 3 with four pyramid levels, i.e. the original digital image 101, base digital images 103a, 103b, 103c, and residual digital images 104a, 104b, and 104c, the present invention can be use used with image pyramid representations with a greater or lesser number of pyramid levels. The preferred embodiment of the present invention uses six pyramid levels for original digital images that have approximately 1000 by 1500 pixels for each color digital image channel of pixels.

Figure 4:
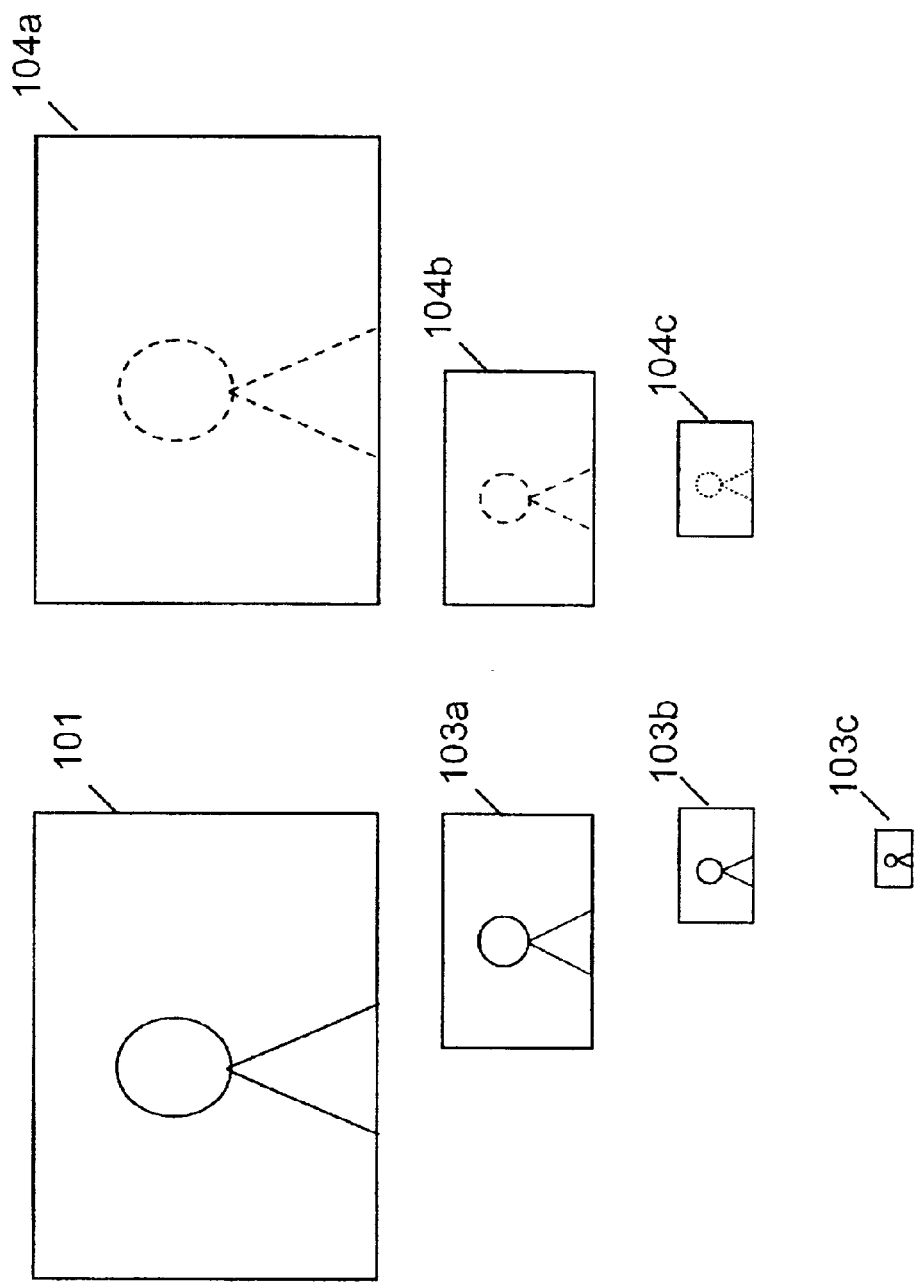
FIG. 4 is a diagram showing the relative sizes of the original digital image, the residual digital images, and the base digital images in accordance with the present invention.

Each base digital image produced by the pyramid level generation module 115 is of lower spatial resolution, (i.e. has fewer pixels) than the input base digital image. In particular, the output base digital produced by the pyramid level generation module 115 has one fourth as many pixels as the input base digital image. Each residual digital image has the same spatial resolution as the input base digital image. FIG. 4 shows a pictorial representation of the relative sizes of the base digital images and the residual digital images included in the image pyramid representation shown in FIG. 3. It is important to note that all the base digital images have the same type of pixel representation as the original digital image 101, i.e. each can be view directly on a display device 50 and will appear as a natural image. The residual digital images have a different pixel representation. In general, the pixels of the residual digital images have a numerical mean of zero and therefore are expressed as both positive and negative numbers. The pixel content of the residual digital images represent high spatial frequency image detail wherein the image detail of the different residual digital images relate to different pass-band spatial frequencies.

Figure 5:
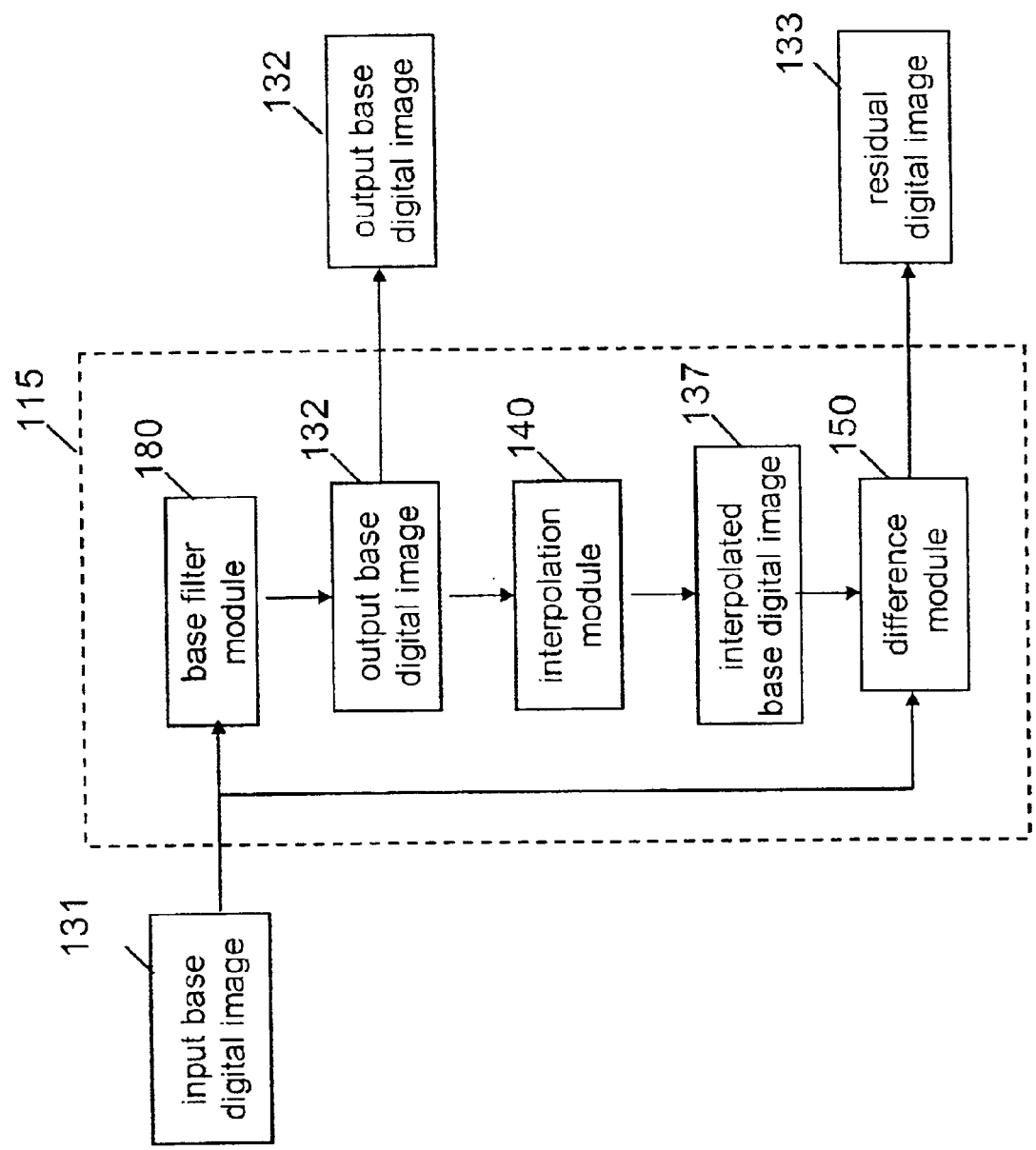
FIG. 5 is a functional block diagram showing in more detail the pyramid level generation module of FIG. 3.

The pyramid level generation module 115 shown in FIG. 3 is illustrated in more detail in FIG. 5. An input base digital image 131 is received by the base filter module 180 which applies a spatial filter to the input base digital image 131 which convolves and samples the pixel data. Although the present invention can be practiced with sampling factors of 3, or higher, a sampling factor of 2 is preferred. The resultant output base digital image 132 is a lower spatial resolution version of the input base digital image 131, i.e. the output base digital image 132 has fewer pixels than the input base digital image 131. The output base digital image 132 is received by the interpolation module 140 which produces an interpolated base digital image 137, i.e. a higher spatial resolution version of the output base digital image 132. The interpolated base digital image 137 has the same spatial resolution as the input base digital image 131. The difference module 150 receives the interpolated digital image 137 and the input base digital image 131 and produces a residual digital image 133.

One pass through the pyramid level generation module 115 produces an output base digital image and a residual digital image. The present invention uses the computer memory of the input base digital image to store the newly generated residual digital image 133. The interpolated base digital image 137 is discarded in computer memory since it is not needed to continue the processing. The residual digital image 133 is stored in the memory of the input base digital image 131 since the input base digital image 131 is also not need to continue the processing. However, both the interpolated base digital image 137 and the input base digital image 131 can be retained if other processes in the system can use them. Therefore, the collection of the residual digital images and the lowest resolution base digital image constitutes a digital image pyramid representation since the original digital image 101 can be reconstructed from the collection of the residual digital images and the lowest resolution base digital image. The last base digital image produced is referred to as the final base digital image (103c for the example shown in FIG. 3). The collection of the all the base digital images, all the residual digital images, and the original digital image can also be considered an image pyramid representation.

Figure 6:
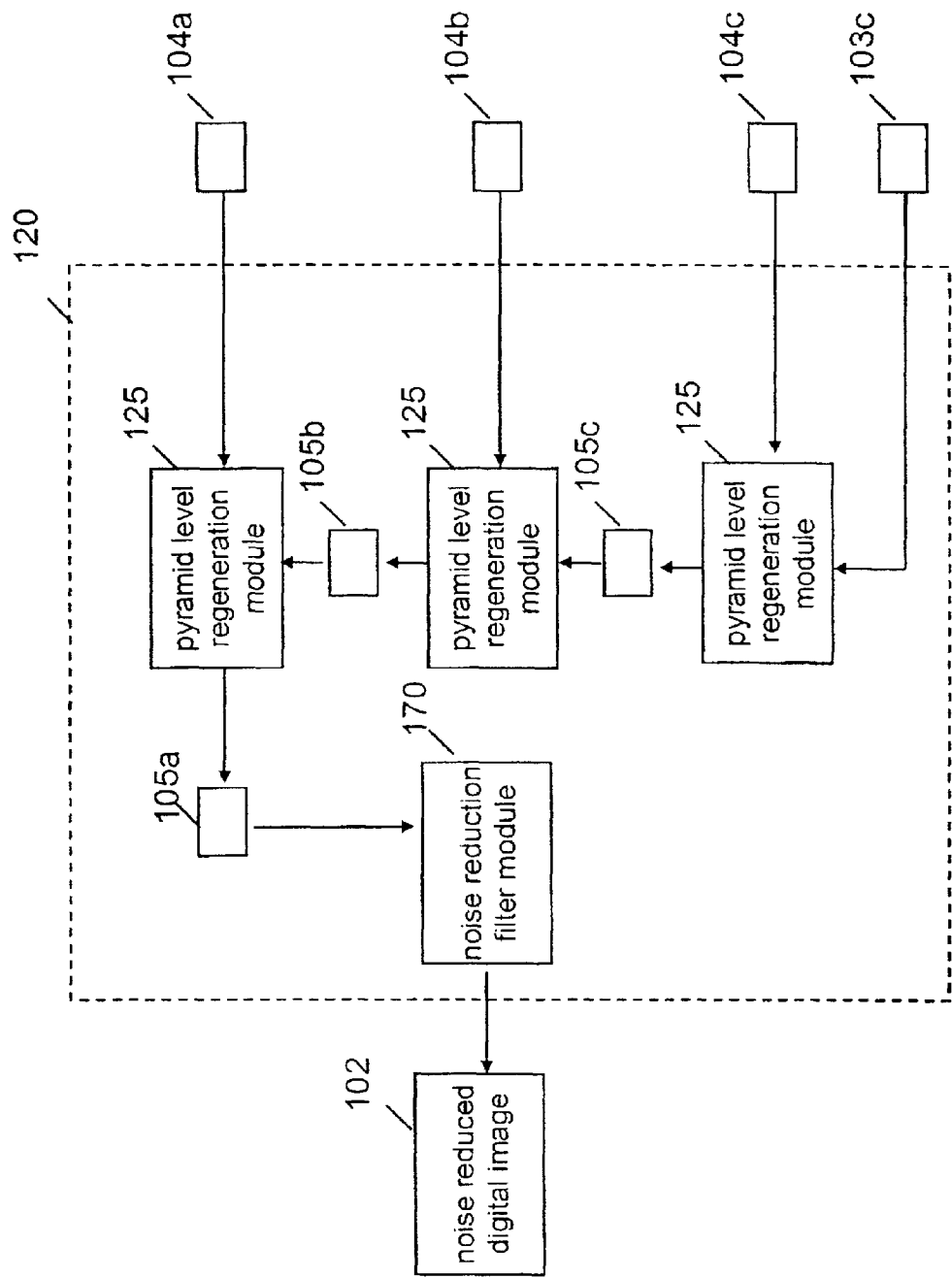
FIG. 6 is a functional block diagram showing in more detail the pyramid reconstruction module of FIG. 2.

The pyramid reconstruction module 120 shown in FIG. 2 is illustrated in more detail in FIG. 6. The image pyramid representation shown in FIG. 3 is received by the pyramid reconstruction module 120 which produces a noise reduced digital image 102 by successively applying the pyramid level regeneration module 125 to a base digital image. The pyramid level regeneration module 125 receives the final base digital image as the starting input base digital image 103c, i.e. the lowest base digital image of the image pyramid representation, and the residual digital image 104c (the lowest spatial resolution residual digital image) and generates a noise reduced base digital image 105c. The noise reduced base digital image 105c is of the same spatial resolution as the residual digital image 104c. The second application of the pyramid level regeneration module 125 uses the noise reduced base digital image 105c as the input base digital image and receives residual digital image 104b (the next higher spatial resolution residual digital image) and generates noise reduced base digital image 105b. The third application of the pyramid level regeneration module 125 uses the noise reduced base digital image 105b as the input base digital image and receives residual digital image 104a and generates a noise reduced base digital image 105a. The noise reduced base digital image 105a is received by the noise reduction filter 170 which produces the noise reduced digital image 102. In the preferred embodiment of the present invention, a noise reduction filter is used as part of the processing within the pyramid level regeneration module 125. Thus the reconstructed digital image, the noise reduced base digital image 105a, is of the same spatial resolution as the original digital image 101.

Figure 7:
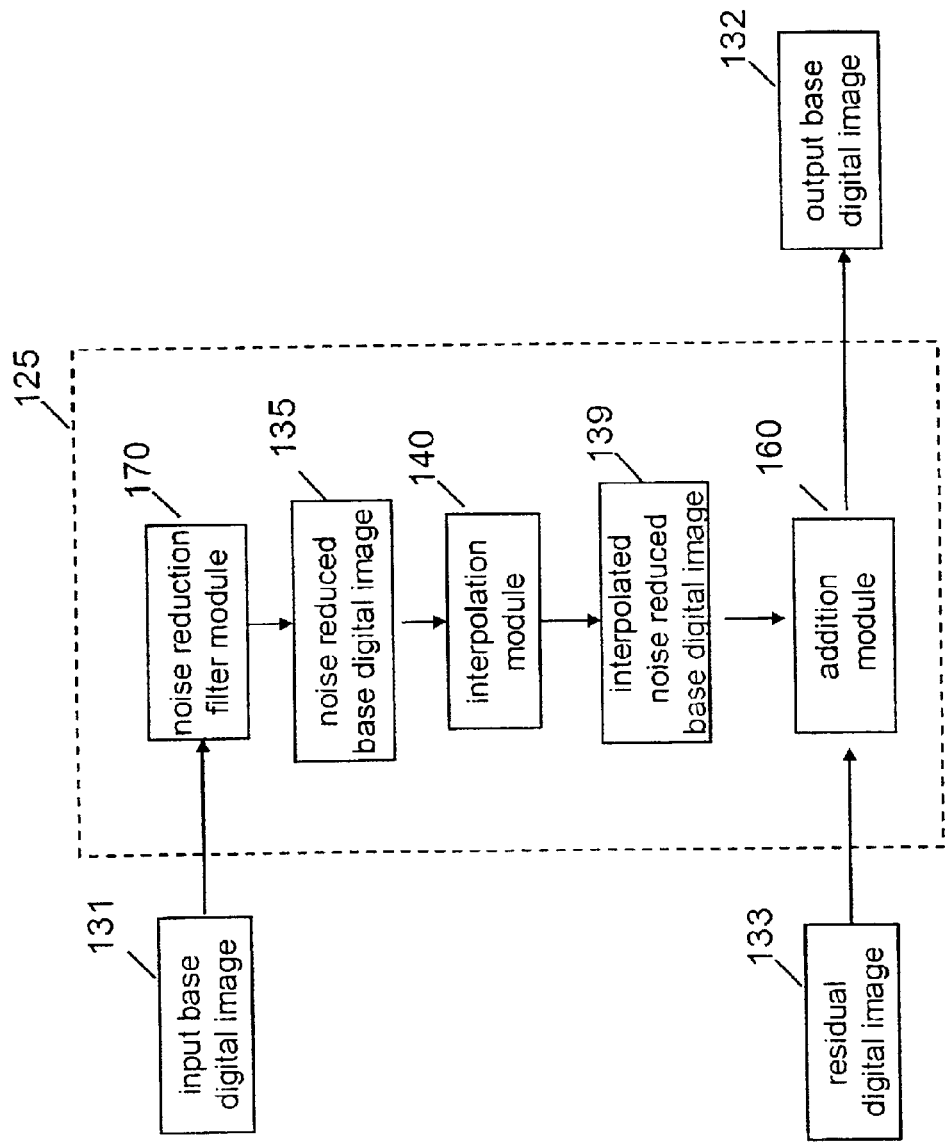
FIG. 7 is a functional block diagram showing in more detail the pyramid level regeneration module of FIG. 6.

The pyramid level regeneration module 125 shown in FIG. 6 is illustrated in more detail in FIG. 7. The noise reduction filter module 170 receives and processes the input base digital image 131 to produce a noise reduced base digital image 135. The noise reduction filter module 170 removes noise from the input base digital image 131 with the application of a noise reduction filter. The interpolation module 140 receives the noise reduced base digital image 135 and produces an interpolated noise reduced base digital image 139. The addition module 160 receives the interpolated noise reduced base digital image 139 and the residual digital image 133 and generates an output base digital image 132. The addition module 160 and the difference module 150 perform inverse functions of one another. The difference module 150 of the present invention numerically subtracts the corresponding pixels of the two digital images it receives. The addition module 160 of the present invention adds together the two digital images it receives. Those skilled in the art will recognize that the present invention can be practiced with other difference modules and addition modules. However, if different methods are used for the difference module 150 and the addition module 160 the best results will be obtained if the functions these two modules performs are mathematical inverses of one another.

Several aspects of the noise removal process of the present invention should be noted. Since the noise reduction filter module 170 is applied to a base digital image, and a base digital image has the same pixel representation as the original digital image 101, the present invention can be practiced with any noise reduction filter that can receive and process the original digital image 101. Furthermore, although the present invention uses the same noise reduction filter at each pyramid level, or pass through the noise reduction filter module 170, this is not a requirement of the present invention. Thus, different noise reduction filters can be used for the different pyramid levels. This can yield noise removal performance advantages if analysis can be shown that the noise characteristics for a particular source of digital images varies as a function of spatial frequency.

Another important aspect of the present invention relates to the flexibility of different spatial resolutions of noise reduced digital images produced. Since the present invention produces base digital images 103a, 103b, and 103c with successively smaller spatial resolution, any of the corresponding noise reduced based digital images produced by the pyramid reconstruction module 120 can be saved in computer memory for use as output or received by another digital imaging application for further processing. Therefore, the present invention can be used for digital imaging applications that make use of a noise reduced digital image of lower resolution than the original digital image 101. It is also possible to use the present invention in a mode for which the final processed digital image is of lower spatial resolution than the original digital image 101.

Referring to FIG. 5, the base filter module 180 receives an input base digital image 131 and generates an output base digital image 132. As a first step in generating an output base digital image a low-pass spatial filter is convolved with the pixel data of the input base digital image 131. Since the output base digital image 132 is of lower spatial resolution than the input base digital image 131, it is not necessary to apply the low-pass spatial filter to all pixels of the original digital image 101. The preferred embodiment of the present invention uses two one-dimensional Gaussian filters oriented orthogonally to one another as the low-pass spatial filter. The same actual spatial filter kernel data is used for both spatial orientations. The values of the one-dimensional Gaussian filter is given by equation (1) for a normalized one by five pixel spatial filter for a Gaussian standard deviation of 1.2.

$$0.0858 \quad 0.243 \quad 0.343 \quad 0.243 \quad 0.0858 \qquad (1)$$

Other values for the Gaussian standard deviation value can also yield good image quality results. A useful range is approximately from 0.6 to 2.0 pixels. For smaller values of the Gaussian standard deviation a one by three filter size may be sufficient. The spatial filtering and spatial sampling performed by the base filter module 180 is accomplished in a two pass operation. A horizontal one-dimensional Gaussian filter is convolved with the pixel data of the input base digital image 131 to produce an first pass image. In this operation, the horizontal one-dimensional Gaussian filter is applied to every other horizontal pixel. Therefore the horizontal dimension of the first pass image is one half that of the original digital image 101 and the vertical dimension of the first pass image is equal to that of the original digital image 101. On the second pass of the spatial filtering operation, a vertical one-dimensional Gaussian filter is convolved with the pixel data of the first pass image to produce the output base digital image 132. In this operation, the vertical one-dimensional Gaussian filter is applied to every other vertical pixel. Therefore the horizontal dimension of the output base digital image 132 is one half that of the input base digital image 131 and the vertical dimension of the base digital image is one half that of the input base digital image 131. Thus, the base filter module 180 performs both a spatial filtering operation and a spatial sampling operation by applying the Gaussian filter to selected pixels. The present invention uses a five element spatial filter. Those skilled in the art will recognize that the present invention can be used with other Gaussian filters with more or less elements and non-Gaussian filters and still derive benefits of the present invention.

In an alternative embodiment of the present invention a two dimensional spatial filter is used to generate the output base digital image 132. In particular a two-dimensional Gaussian spatial filter kernel is used. In this operation, the two dimensional spatial filter is applied to every other horizontal pixel and every other vertical pixel. As with the preferred embodiment of the present invention, the horizontal dimension of the output base digital image 132 is one half that of the input base digital image 131 and the vertical dimension of the output base digital image 132 is one half that of the input base digital image 131. This alternative embodiment of the present invention uses a 5 by 5 element spatial filter. Those skilled in the art will recognize that the present invention can be used with other Gaussian filters with more or less elements and non-Gaussian low-pass filters and still derive benefits of the present invention. Those skilled in the art will also recognize that the spatial sampling operation and the spatial filtering operation performed by the base filter module 180 can be separated into to distinct operations.

Referring to FIG. 5, the interpolation module 140 receives output base digital image 132 and generates an interpolated base digital image 137 of the same spatial resolution as the input base digital image 131. The operation of the interpolation module 140 is a two step process. In the first step, the pixel data from the output base digital image 132 is up-sampled to populate pixels of the interpolated base digital image. At this stage, every even pixel of every even row in the interpolated base digital image 137 has an assigned pixel value taken from the output base digital image 132. Also, every odd pixel of every even row in the interpolated base digital image 137 does not have an assigned value nor does every pixel of every odd row. The present invention uses a bi-linear interpolation method to generate the missing pixel values. For every odd pixel of every even row in the interpolated base digital image 137 the average of the two nearest horizontal pixel values is used to assign the missing pixel value. Similarly, for every even pixel of every odd row in the interpolated base digital image 137 the average of the two nearest vertical pixel values is used to assign the missing pixel value. Lastly, for every odd pixel of every odd row in the interpolated base digital image, the average of the two nearest horizontal pixel values is used to assign the missing pixel value. This is mathematically equivalent to using the nearest two vertical pixel values or using the nearest four sampled pixel values from the output base digital image 132. Those skilled in the art will recognize that operation of the interpolation module 140 does not need to be performed as separate steps. It is also possible to implement the present invention in a one step process of up-sampling and interpolation.

The essential aspect of the interpolation filter used is the generation of an interpolated base digital image of the same resolution as the input base digital image 131. The present invention uses the bi-linear interpolation filter for its computational efficiency and overall acceptable quality. The present invention can be practiced with other interpolation filters. In an alternative embodiment of the present invention a bi-cubic interpolation filter is used as described by Press et al. their publication "Numerical Recipes" produced by the Cambridge University Press on pages 98–101. Although the bi-cubic interpolation filter generally produces higher quality results as compared with the bi-linear interpolation filter, more pixels must be used from a local neighborhood of pixels to generate the missing pixel values thus requiring more computational resources.

The interpolation module 140 described above is used for both the pyramid construction processing as well as the pyramid reconstruction processing. The action of the interpolation module 140 is the same in either case. However, the resultant image produced by the interpolation module 140 shall be called the interpolated base digital image 137 for the pyramid construction process since a noise reduction filter has not yet been applied to the base digital image. Similarly for the pyramid reconstruction process, the result of the interpolation module 140 shall be called the interpolated noise reduced base digital image since a noise reduction filter has been applied to the base digital image. It should also be noted for clarity that the interpolation module 140 always produces an output digital image of higher spatial resolution than the received digital image.

Figure 8:
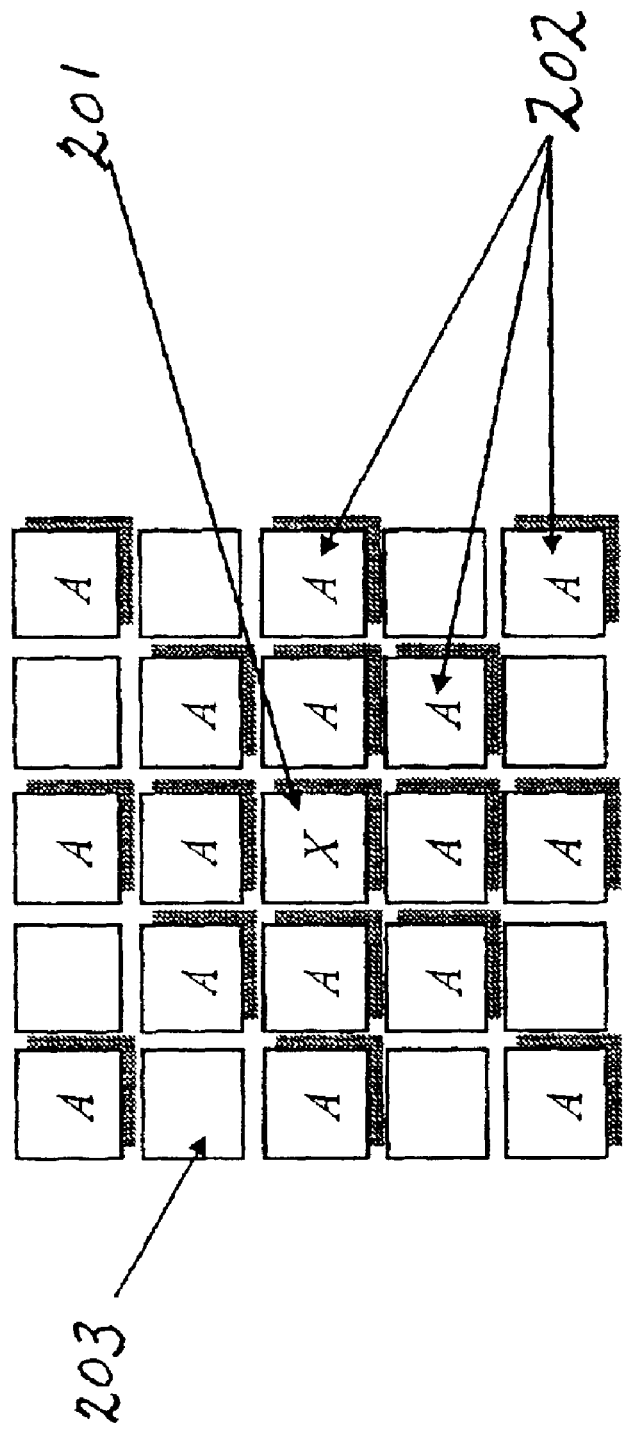
FIG. 8 is a diagram of the pixels geometry employed by a noise reduction filter.

Referring to FIG. 7, the noise reduction filter module 170 receives an input base digital image 131 and generates a noise reduced base digital image 135 by applying a noise reduction filter to the pixels of the base digital image. The present invention can be used with any noise reduction filter that is designed to be applied to the original digital image 101. The preferred embodiment of the present invention uses a modified implementation of the Sigma filter, described by Lee in the journal article *Digital Image Smoothing and the Sigma Filter*, referenced above, as a noise reduction filter to enhance the appearance of the processed digital image. The values of the pixels contained in a local neighborhood of n by n pixels where n denotes the length of pixels in either the row or column direction, are compared with the value of the center pixel, or pixel of interest. Each pixel in the local neighborhood of pixels is given a weighting factor of one or zero based on the absolute difference between the value of the pixel of interest and the local pixel value, i.e. a difference pixel value. If the absolute value of the pixel value difference is less or equal to a threshold value $\epsilon$, the weighting factor is set to one; otherwise, the weighting factor is set to zero. The numerical constant $\epsilon$ is set to between four and eight times the expected noise standard deviation which achieves an aggressive degree of noise removal ensuring that most of the noise is removed. The optimum value for $\epsilon$ has been experimentally determined to be approximately 5.0. Mathematically the expression for the calculation of the noise reduced pixel value is given as $$q_{mn} = \Sigma_{ij} a_{ij} p_{ij} / \Sigma_{ij} a_{ij} \qquad (2)$$

and $$a_{ij} = 1 \text{ if } |p_{ij} - p_{mn}| <= \epsilon$$
$$a_{ij} = 0 \text{ if } |p_{ij} - p_{mn}| > \epsilon$$

where $p_{ij}$ represents the $ij^{th}$ pixel contained in the local neighborhood of pixels, $p_{mn}$ represents the value of the pixel of interest located at row m and column n, $a_{ij}$ represents a weighting factor, and $q_{mn}$ represents the noise reduced pixel value. Typically, a local neighborhood of pixels centered about the center pixel is used with the indices i and j varying to sample the local pixel values for Sigma filter applications. The preferred embodiment of the present invention uses a radial pattern of pixels within an n by n local neighborhood of pixels as illustrated in FIG. 8. The pixel of interest 201 is shown in the center with local pixels 202 shown in a radial pattern about the pixel of interest 201. The pixel locations 203 shown without letter designations are not used in the calculation of the noise reduced pixel values.

The present invention also incorporates a signal dependent noise feature through a modification of the expression for the threshold $\epsilon$ given by equation (3)

$$\epsilon = Sfac \, \sigma_n(p_{mn}) \qquad (3)$$

where $\sigma_n$ represents the noise standard deviation of the base digital image evaluated at the center pixel value $p_{mn}$ as described above. It is not a requirement that the threshold $\epsilon$ be evaluated at the pixel of interest. However, it is important that the threshold $\epsilon$ be a function of the values of pixels of the local neighborhood. The parameter Sfac is a scale factor, or control parameter, that can be used to vary the degree of noise reduction. The optimal value for the Sfac parameter has been found to be 5.0 through experimentation however values ranging from 4.0 to 8.0 can also produce acceptable results. The noise reduced pixel value $q_{mn}$ is calculated as the division of the two sums. The process is completed for some or all of the pixels contained in the digital image channel and for some or all the digital image channels contained in the digital image.

The modified Sigma filter employed by the present invention is an example of a noise reduction filter that is adaptive since it changes in response to the signal content of the pixels values of the digital image and is responsive to the magnitude of expected noise. The modified implementation of the Sigma filter is also an example of a noise reduction filter that uses a noise characteristic table. That is, the values of $\sigma_n$ are tabulated in a table of noise standard deviation values as function of the digital image channel and numerical pixel values. An example of a noise characteristic table for $\sigma_n$ is given in Table 1 for a digital image having red, green, and blue digital image channels. Since the noise characteristics of most digital images are a function of spatial resolution, the present invention uses a different noise characteristic table for processing different pyramid levels.

TABLE 1

| average pixel value | Standard deviation of red channel | Standard deviation of green channel | Standard deviation of blue channel |
| --- | --- | --- | --- |
| 32 | 14.132 | 14.836 | 14.745 |
| 160 | 16.282 | 14.827 | 14.745 |
| 288 | 19.460 | 19.873 | 22.768 |
| 416 | 22.325 | 20.644 | 24.111 |
| 544 | 29.098 | 20.400 | 37.279 |
| 672 | 29.032 | 35.424 | 30.956 |
| 800 | 19.186 | 23.233 | 27.736 |
| 928 | 14.883 | 24.201 | 20.064 |
| 1056 | 24.077 | 24.232 | 27.932 |
| 1184 | 22.136 | 21.702 | 25.739 |
| 1312 | 13.509 | 18.590 | 22.484 |
| 1440 | 11.503 | 18.501 | 24.113 |
| 1568 | 11.503 | 18.501 | 23.683 |

The sigma filter as described by Lee is one example of a pixel difference filter. The central aspect of a pixel difference filter is a spatial filter that calculates a noise reduced pixel value based on the pixel values in a local neighborhood of pixels about a pixel of interest, wherein the influence of each local pixel is based on the absolute value of the difference between the local pixel value and a reference numerical value (difference pixel value) derived from the pixels in the local neighborhood. The preferred embodiment of a pixel difference filter used in the present invention uses the pixel of interest as the reference numerical value. Other values such as the average of pixels in the local neighborhood can also be used as the reference numerical value.

The present invention can be used with other noise reduction filters. An alternative embodiment of the present invention uses an area 5 by 5 pixel region median filter as the noise reduction logic to form the noise reduced pixel value. Thus, for the median filter embodiment no a priori knowledge of the noise associated with the original digital image 101 is required.

Referring to FIG. 2, since the present invention performs more than one pass through the pyramid construction module 110 and the pyramid reconstruction module 120, it is possible to practice the present invention in a mode wherein a different noise reduction filter is employed by the noise reduction filter module 170 of FIG. 7 for different pyramid levels. For example, a median filter can be used for the first pass while the Sigma filter can be used for the other passes. This feature of the present invention allows the system designer of the digital imaging application the ability to tailor the present invention for particular sources of digital images. For the example described above, a median filter works well for digital images corrupted by spurious noise. Thus, using a median filter for the highest spatial frequency components of noise is more effective for reducing spurious noise. For the lower spatial frequency components of the same digital images Gaussian additive noise may dominate. Therefore, employing the Sigma filter for the other pyramid levels would be more effective than using the median filter for all pyramid levels.

The preferred embodiment of the present invention employs the noise reduction filter during the pyramid reconstruction phase of the processing. In an alternative embodiment, the noise reduction filter is employed during the pyramid construction phase of the processing. In this alternative embodiment, the processing steps are essentially the same as for the preferred embodiment with the exception of the placement of the noise reduction filter module 170 of FIG. 7 prior to the employment of the base filter module 180 of FIG. 5 within the pyramid level generation module 115. Similarly, the processing steps are essentially the same as for the preferred embodiment with the exception of the omission of the noise reduction filter module 170 within the pyramid level regeneration module 125. The processing starts by applying the noise reduction filter 170 to the original digital image 101 to produce a noise reduced digital image. This noise reduced digital image is used as the input base digital image for the first application of the pyramid level generation module 115.

Figure 9:
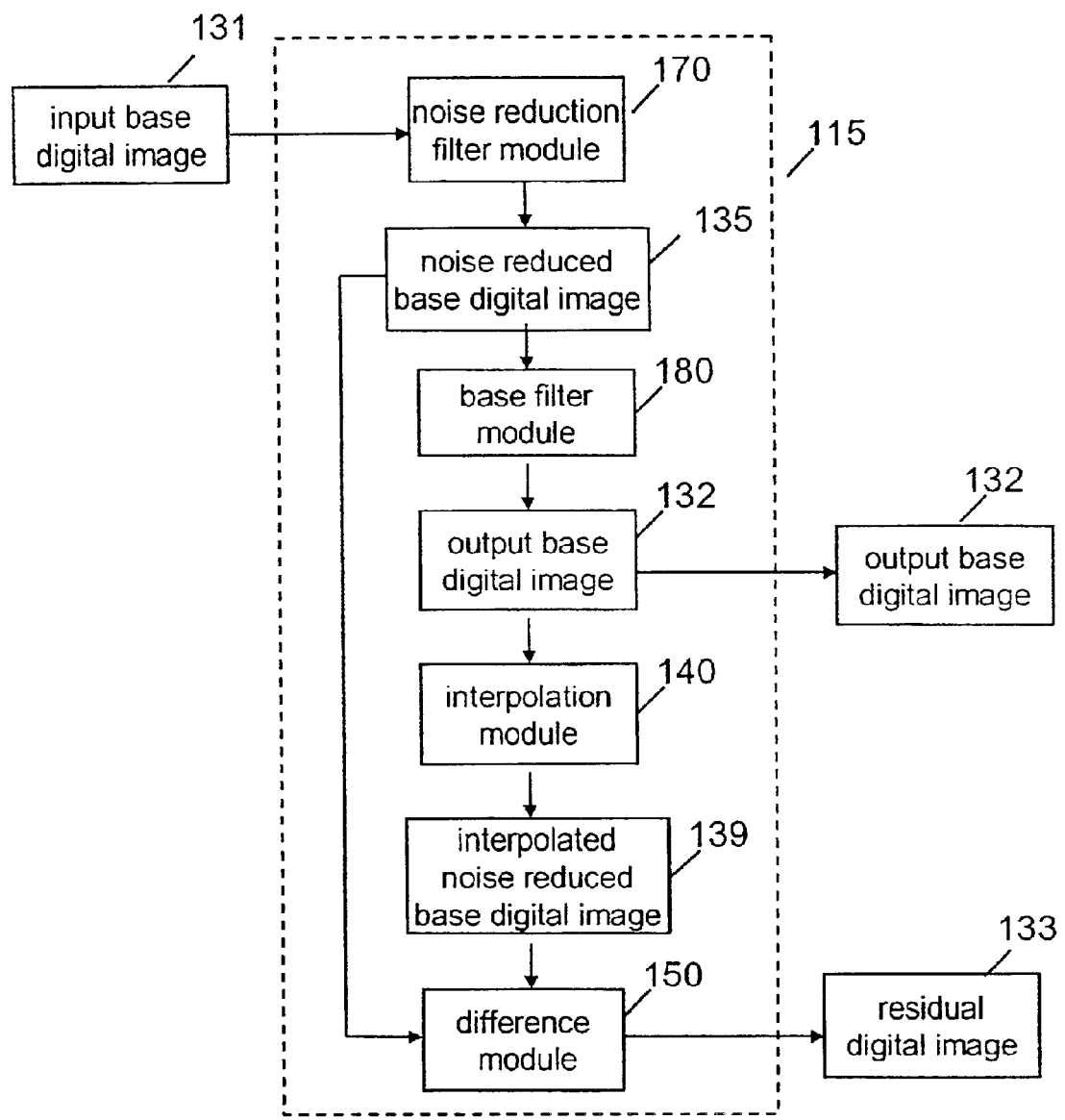
FIG. 9 is a functional block diagram of another embodiment of the pyramid level generation module of FIG. 3.

Referring to FIG. 9, the pyramid level generation module 115 shown in FIG. 3 is illustrated in more detail for this alternative embodiment of the present invention. The input base digital image 131 is received and processed by the noise reduction filter 170 to produce a noise reduced base digital image 135. The noise reduced base digital image 135 is received by the base filter module 180 which generates an output base digital image 132. The output base digital image 132 is received by the interpolation module 140 which produces an interpolated noise reduced base digital image 139. The difference module 150 receives the interpolated noise reduced base digital image 139 and the noise reduced base digital image 135 and produces a residual digital image 133.

Figure 10:
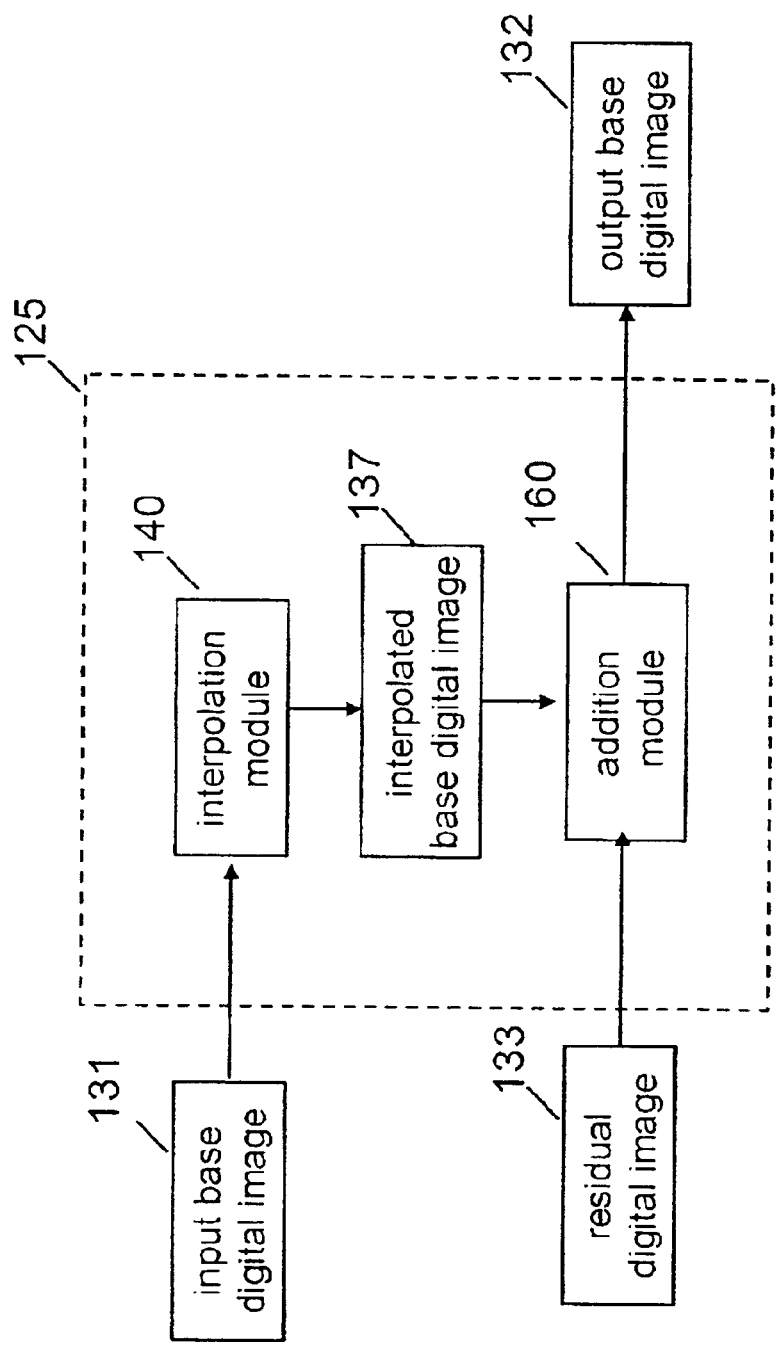
FIG. 10 is a functional block diagram of another embodiment of the pyramid level regeneration module of FIG. 6.

Referring to FIG. 10, the corresponding alternative embodiment of the pyramid level regeneration module 125 is illustrated in more detail. The interpolation module 140 receives an input base digital image 131 and produces an interpolated base digital image 137. The addition module 160 receives the interpolated base digital image 137 and the residual digital image 133 and generates an output base digital image 132.

It should also be noted that if the pyramid level generation module 115 shown in FIG. 5 is used in conjunction with the pyramid level regeneration module 125 shown in FIG. 10, the reconstructed digital image formed, i.e. the noise reduced digital image 102 is identical to the input digital image, i.e. the original digital image 101. Therefore, it will be appreciated that the image pyramid representation 108 of the original digital image 101 can be used to reconstruct the original digital image 101 if no noise removal processing is performed on the components of the image pyramid representation 108.

An important aspect of the present invention is the application of a noise reduction filter to one or more of the base digital images of an image pyramid representation. It should be noted that while each residual digital image of an image pyramid representation does relate to a different pass-band of spatial frequency content, not all of the spatial frequency content of a given pass-band of spatial frequencies is contained within any single residual digital image. In particular, some of the spatial frequency content of a given pass-band of spatial frequencies is contained in the corresponding spatial resolution base digital image. Since the spatial frequency content of a given pass-band of spatial frequencies is distributed rather than isolated, removing noise from a base digital image may have a similar effect on the resultant processed digital image as removing noise from the corresponding residual digital image. However, the spatial frequency content of a given pass-band of spatial frequencies contained in a base digital image is not identical to the spatial frequency content of the same pass-band of spatial frequencies contained in the corresponding residual digital image. Therefore, removing noise from a base digital image does not have the identical effect of removing noise from the corresponding residual digital image.

Figure 11:
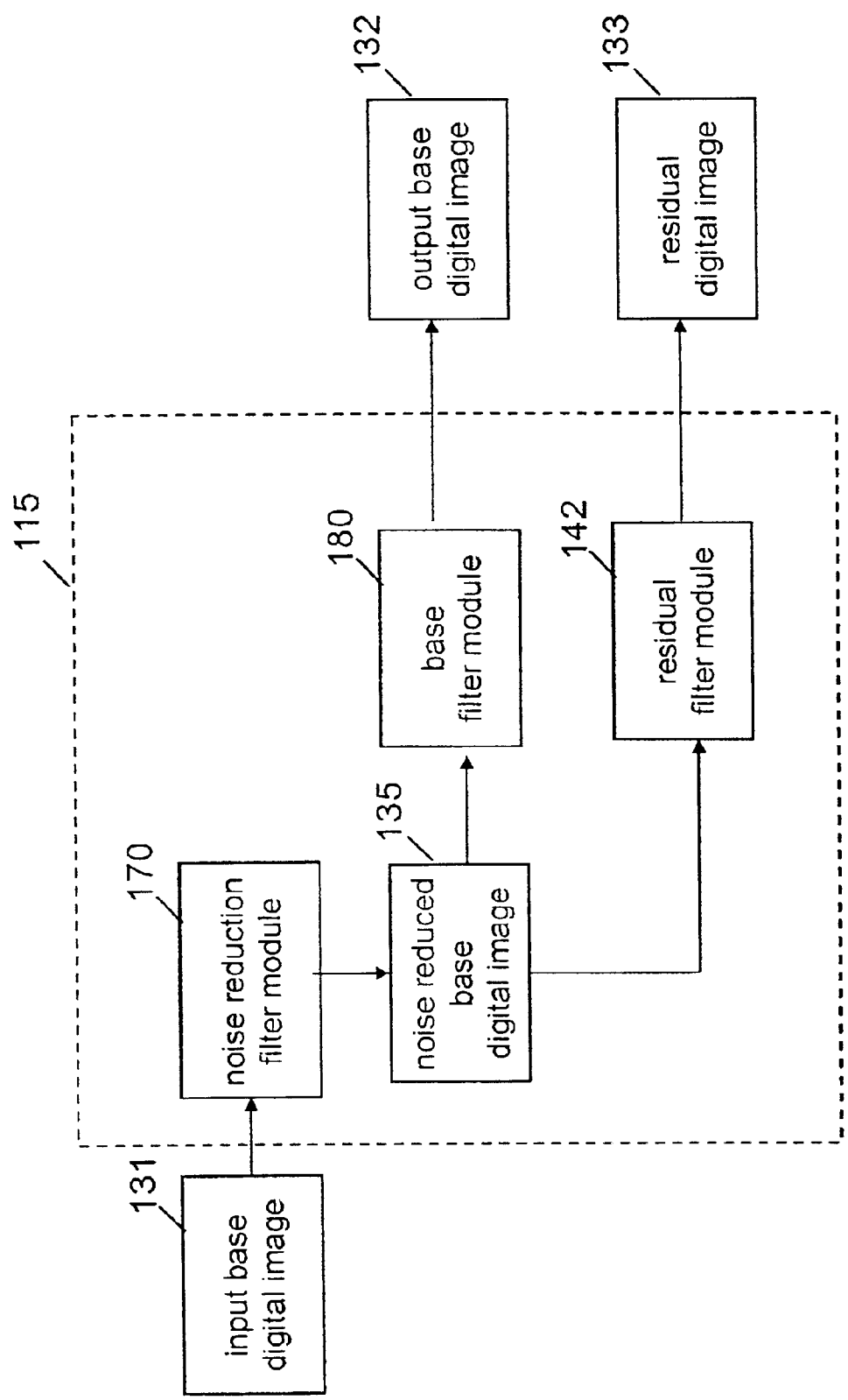
FIG. 11 is a functional block diagram of a still further embodiment of the pyramid level generation module of FIG. 3.

An important aspect of the present invention is the ability to use a variety of different digital image pyramid representations. An alternative embodiment of the present invention uses an image pyramid representation based on the wavelet transform as described by Adelson et al. in U.S. Pat. No. 5,526,446. FIG. 11 shows the details of the pyramid level generation module 115 for this alternative embodiment. The noise reduction filter module 170 receives and processes the input base digital image 131 resulting in a noise reduced base digital image 135. The noise reduced base digital image 135 is received by the base filter module 180 which generates an output base digital image 132 containing the low resolution wavelet coefficients produced by the application of the wavelet transform. The noise reduced base digital image 135 is also received by the residual filter module 142 which produces a residual digital image 133 containing the high frequency wavelet coefficients produced by the application of the wavelet transform. The wavelet transform is accomplished through the application of wavelet filters, i.e. specialized spatial filters applied to image pixel data. The residual digital image 133 actually contains three high frequency wavelet coefficient elements, one corresponding to the horizontally filtered image, one corresponding to the vertically filtered image, and one corresponding to the vertically and horizontally filtered image. Each high frequency wavelet coefficient element is a digital image having half the linear spatial resolution as the input base digital image 131.

Figure 12:
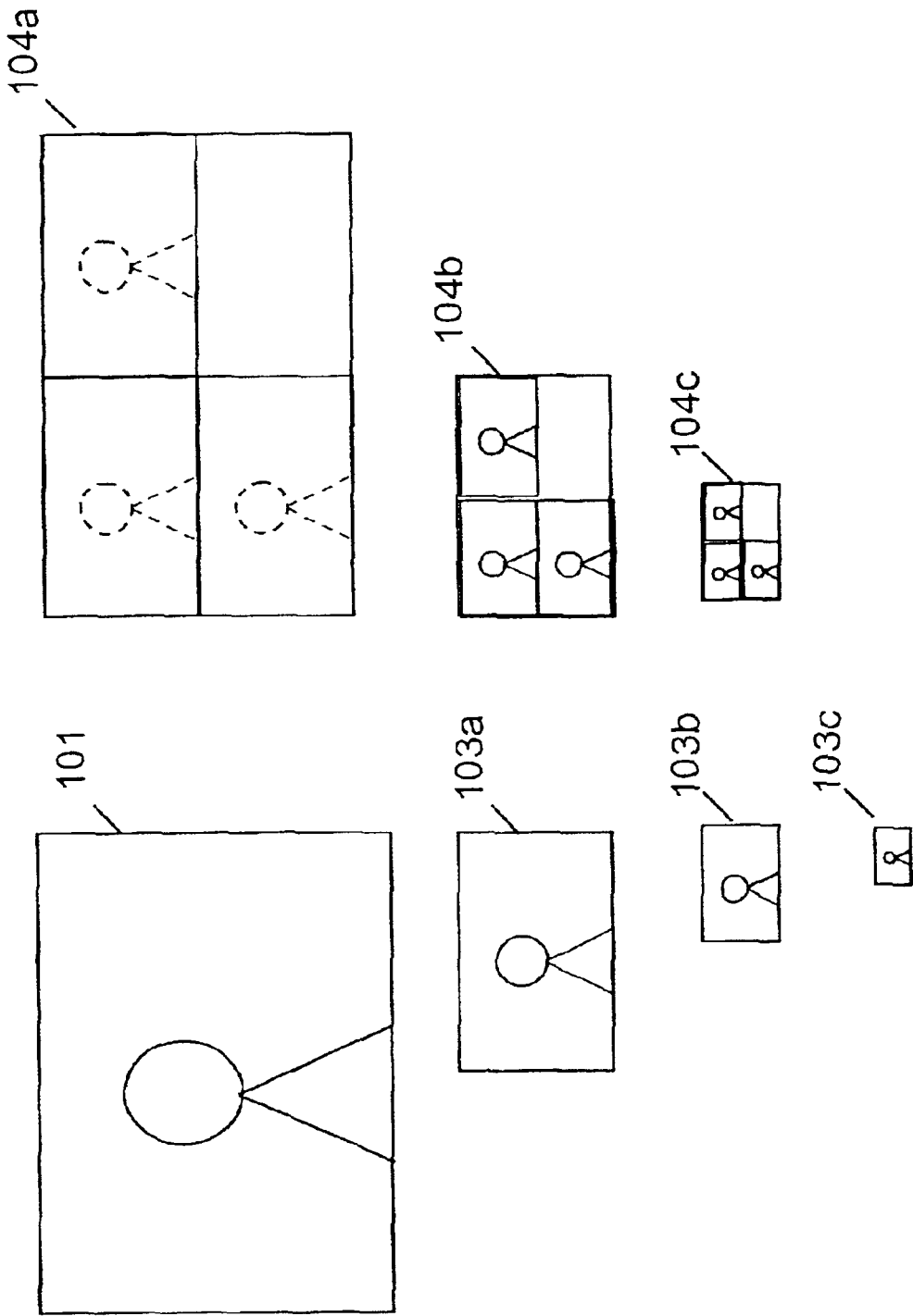
FIG. 12 is a diagram showing the relative sizes of the original digital image, the residual digital images, and the base digital images in an alternative embodiment in accordance with the present invention.

On the first application of the pyramid level generation module 115, the original digital image 101 is used as the starting input base digital image. On the second application of the pyramid level generation module 115, the output base digital image from the previous application is substituted for the input base digital image 131 and processed in similar manner. The present invention uses a six level digital image pyramid representation. Therefore, after multiple applications of the pyramid level generation module 115 an image pyramid representation 108 is generated which includes a plurality of base digital images and a plurality of residual digital images. The base digital images and residual digital images produced with this wavelet based alternative embodiment are shown pictorially in FIG. 12.

Figure 13:
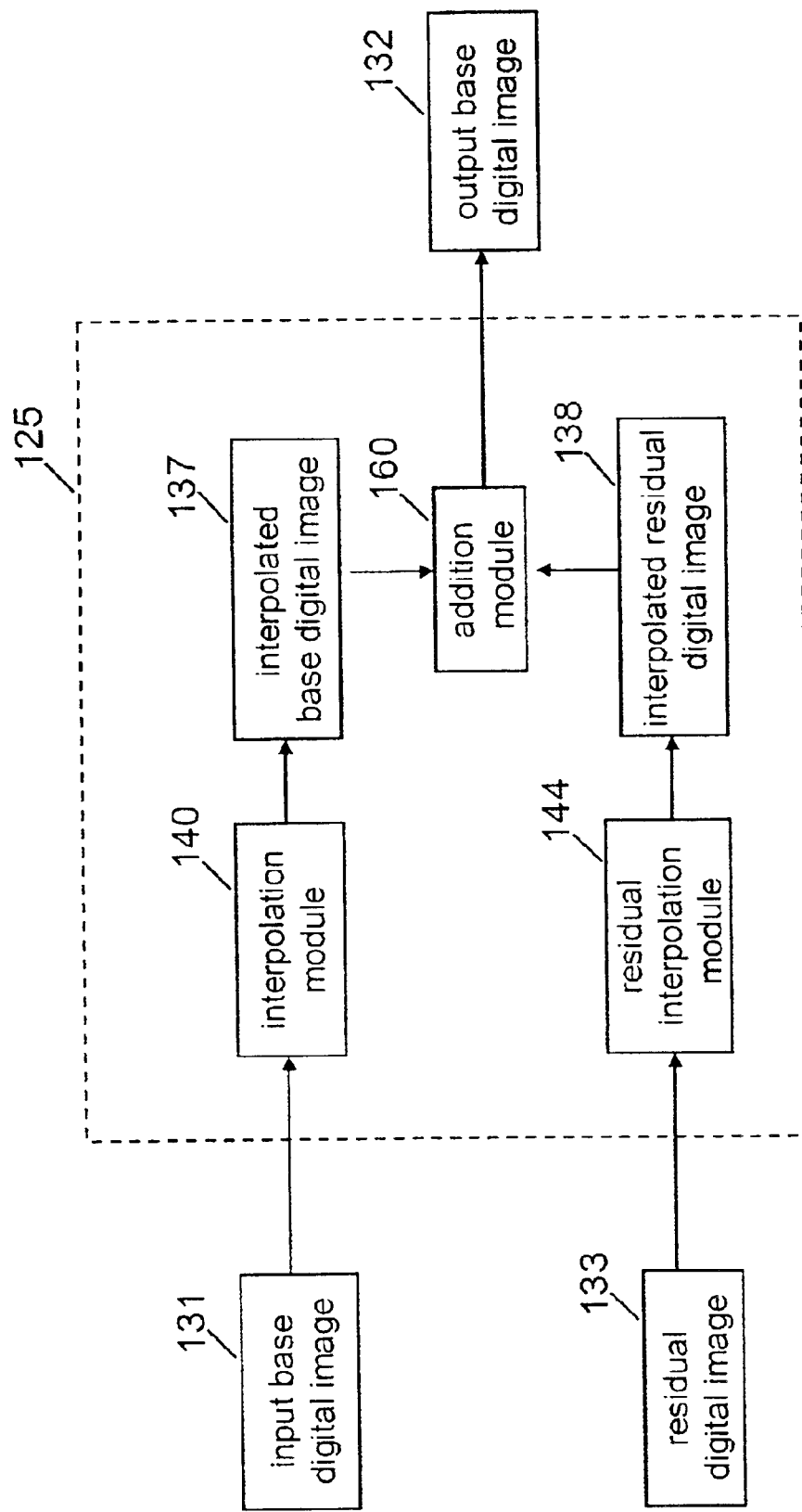
FIG. 13 is a functional block diagram of another embodiment of the pyramid level regeneration module of FIG. 6.

The details of the pyramid level regeneration module 125 for this wavelet based alternative embodiment are shown in FIG. 13. The input base digital image 131 is received by the interpolation module 140 which uses the low resolution wavelet coefficients and the wavelet low frequency interpolation spatial filters to generate an interpolated base digital image. The residual digital image 133 is received by the residual interpolation module 144 which uses the high frequency wavelet coefficient elements and the wavelet high frequency interpolation spatial filters to generate an interpolated residual digital image 138. The interpolated base digital image 137 and the interpolated residual digital image 138 are received by the addition module 160 which adds the interpolated base digital image 137 and the interpolated residual digital image 138 to form the output base digital image 132.

Another alternative embodiment of the present invention uses an image pyramid representation based on the Direct Cosine Transform (DCT) as described by Wober et al. in U.S. Pat. No. 5,729,631. FIG. 11 shows the details of the pyramid level generation module 115 for this alternative embodiment. The noise reduction filter module 170 receives and processes the input base digital image 131 resulting in a noise reduced base digital image 135. The noise reduced base digital image 135 is received by the base filter module 180 which generates an output base digital image 132 containing the DC low frequency components of produced by the application of the Direct Cosine Transform. The noise reduced base digital image 135 is also received by the residual filter module 142 which uses the DCT basis function spatial filters to produce a residual digital image 133 containing the DCT high frequency coefficients produced by the application of the Direct Cosine Transform, i.e. a set of Direct Cosine Transform filters. The residual digital image 133 has the same spatial resolution as the input base digital image 131. The output base digital image 132 is one eighth the spatial resolution as the noise reduced base digital image 135 in each dimension and thus contains one sixty fourth as many pixels as the noise reduced base digital image 135. The present invention uses a two level image pyramid representation for this alternative embodiment due to eight to one spatial resolution reduction of the DCT. This alternative embodiment illustrates that the present invention can be practiced with digital image pyramid representations for which the different pyramid levels differ by a linear spatial resolution factor other than two. However, since the DCT basis functions are general in nature, those skilled in the art will appreciate that a DCT pyramid can be constructed using of spatial resolution factors such as 2 or 4.

The details of the pyramid level regeneration module 125 for this DCT implementation alternative embodiment are shown in FIG. 13. The input base digital image 131 is received by the interpolation module 140 which uses the DC low frequency component values to form an interpolated base digital image 137. The residual digital image 133 is received by the residual interpolation module 144 which uses the DCT high frequency coefficient values to generate an interpolated residual digital image 138. The interpolated base digital image 137 and the interpolated residual digital image 138 are received by the addition module 160 which adds these two digital images to form the output base digital image 132.

Figure 14:
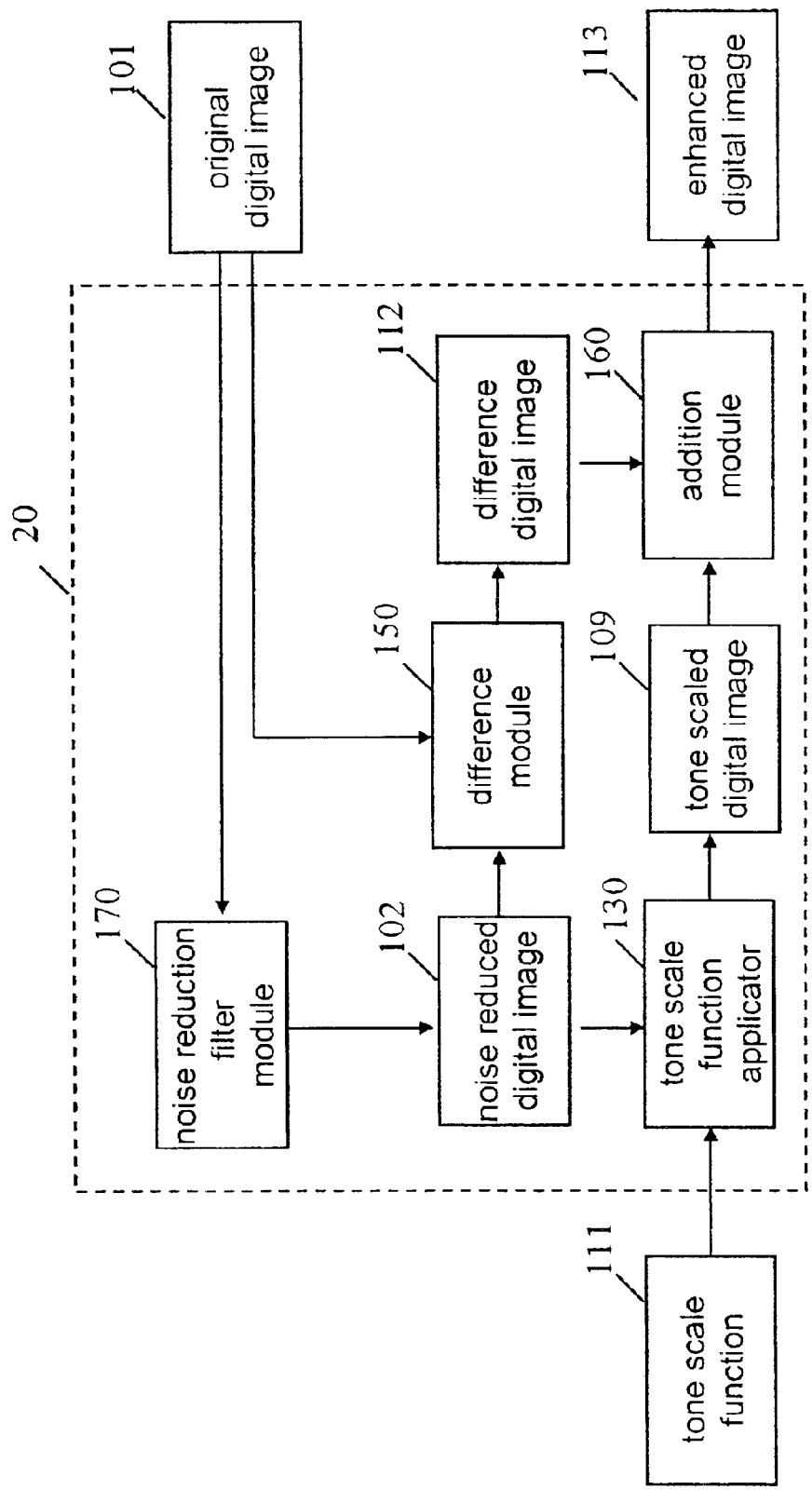
FIG. 14 is a functional block diagram of another embodiment of the pyramid level regeneration module of FIG. 6.

The preferred embodiment of the present invention uses a multiresolution spatial filtering method to generate the noise reduced digital image 102. However, the present invention can also be used with simple low-pass spatial frequency filters and still derive the advantage of reducing the effective magnitude of noise present in the enhanced digital image 113. For this alternative embodiment of the present invention, the digital image processor of FIG. 1 is illustrated in more detail in FIG. 14. The noise reduction filter module 170 receives the original digital image 101 and produces the noise reduced digital image 102. Thus for this alternative embodiment of the present invention the pyramid construction 110 and pyramid reconstruction module 120 are replaced with the noise reduction filter module 170. Although this alternative embodiment does not perform as well as the preferred embodiment, the alternative embodiment is simpler to implement and, depending on the implementation, can require less computer resources.

The present invention can be applied to digital images in a variety of color representations. While the preferred embodiment of the present invention processes color digital images in a red, green, and blue color representation, an alternative embodiment receives color digital images in a luminance-chrominance color representation including a luminance digital image channel and two chrominance digital image channels, i.e. having a luminance component and two chrominance components. A 3 by 3 element matrix transformation can be used to convert the red, green, and blue pixel values of an RGB color digital image into luminance and chrominance pixel values. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $C1_{ij}$, and $C2_{ij}$ refer to the transformed luminance, first chrominance, and second chrominance pixel values respectively of an LCC original digital image. The 3 by 3 elements of the matrix transformation are described by equation (4).

$$L_{ij}=0.333R_{ij}+0.333G_{ij}+0.333B_{ij} \qquad (4)$$

$$C1_{ij}=-0.25R_{ij}+0.50G_{ij}-0.25B_{ij}$$

$$C2_{ij}=-0.50R_{ij}+0.50B_{ij}$$

Those skilled in the art will recognize that the exact values used for coefficients in the luminance/chrominance matrix transformation may be altered and still yield substantially the same effect. An alternative also used in the art is described by equation (5).

$$L_{ij}=0.375R_{ij}+0.500G_{ij}+0.125B_{ij} \qquad (5)$$

$$C1_{ij}=-0.25R_{ij}+0.50G_{ij}-0.25B_{ij}$$

$$C2_{ij}=-0.50R_{ij}+0.50B_{ij}$$

In this alternative embodiment, the $L_{ij}$, $C1_{ij}$, and $C2_{ij}$ pixel values each represent pixel values of different digital image channels. The present invention processes the L luminance digital image channel pixel data separately from the C1 and C2 chrominance digital image channel pixel data. As with the RGB color representation case, this LCC color representation case generates an image pyramid representation separately for the L, C1, and C2 digital image channels. The noise reduction filter is applied to the base digital images as part of either the pyramid reconstruction or pyramid reconstruction processing. The present invention uses a noise characteristic table for the modified Sigma filter that corresponds to the noise in the L, C1, and C2 digital image channels. This alternative embodiment may be useful for digital imaging systems that have other image processing modules that expect to receive an LCC color representation digital image. By using this implementation of the present invention, unnecessary conversions from different color representations can be avoided.

The LCC color representation method is useful particularly for removing noise from digital images produced with digital cameras. Unlike most sources of digital images, the digital images produced by digital cameras often have more noise in the chrominance signals than in the luminance signal at low spatial frequencies. In a still further alternative embodiment of the present invention an LCC color representation original digital image is processed. Similarly, a noise characteristic table is used for the modified Sigma filter that corresponds to the noise in the L, C1 and C2 digital image channels. In this alternative embodiment, a value of 8.0 is used for the scale factor parameter Sfac of equation (3) for the C1 and C2 chrominance digital image channels and a value of 5.0 is used for the L luminance digital image channel. These parameter settings effectively remove more noise from the chrominance digital image channels than luminance digital image channel. Although good results can be obtained by using the scale factor parameter Sfac value for all three digital image channels, better results are obtained for digital camera digital images by using larger values of the scale factor parameter for the chrominance digital image channels. This is probably due to the fact that over smoothing the chrominance signals of images is less objectionable than over smoothing the luminance signals from a human visual perspective. Alternatively, the present invention can be used by processing the chrominance digital image channels and not removing noise from the luminance digital image channel.

The present invention can be employed with any number of pyramid levels. Noise in images is generally a function of spatial resolution and is also more objectionable for the higher spatial resolution pyramid levels. The optimal number of pyramid levels to be used with the present invention depends on the noise removal goals of the digital imaging system designer and on the size of the digital images being processed. The preferred embodiment of the present invention uses six pyramid levels for effective noise removal for digital images of size 1024 by 1536 pixels. For processing digital images of greater spatial resolution, such as 2048 by 3072 pixel, seven pyramid levels are used. For processing digital images of lower spatial resolution, such as 512 by 768 pixels, 5 pyramid levels are used.

Those skilled in the art will recognize that the present invention can be used either in whole as described above, or in part and still substantially achieve the benefits of the present invention. For example, the noise reduction filter can be applied to only selected pixels of a base digital image or original digital image. Similarly, the noise reduction filter need not be applied to all of the base digital images of an image pyramid representation. In an alternative embodiment of the present invention, the noise reduction filter is not applied to the reconstructed digital image which leaves the highest spatial frequency components of noise in the processed digital image. For this alternative embodiment the noise reduced digital image 102 is the reconstructed digital image 105a and results in noise reduced digital images which have just the lower spatial frequency components removed.

Figure 15:
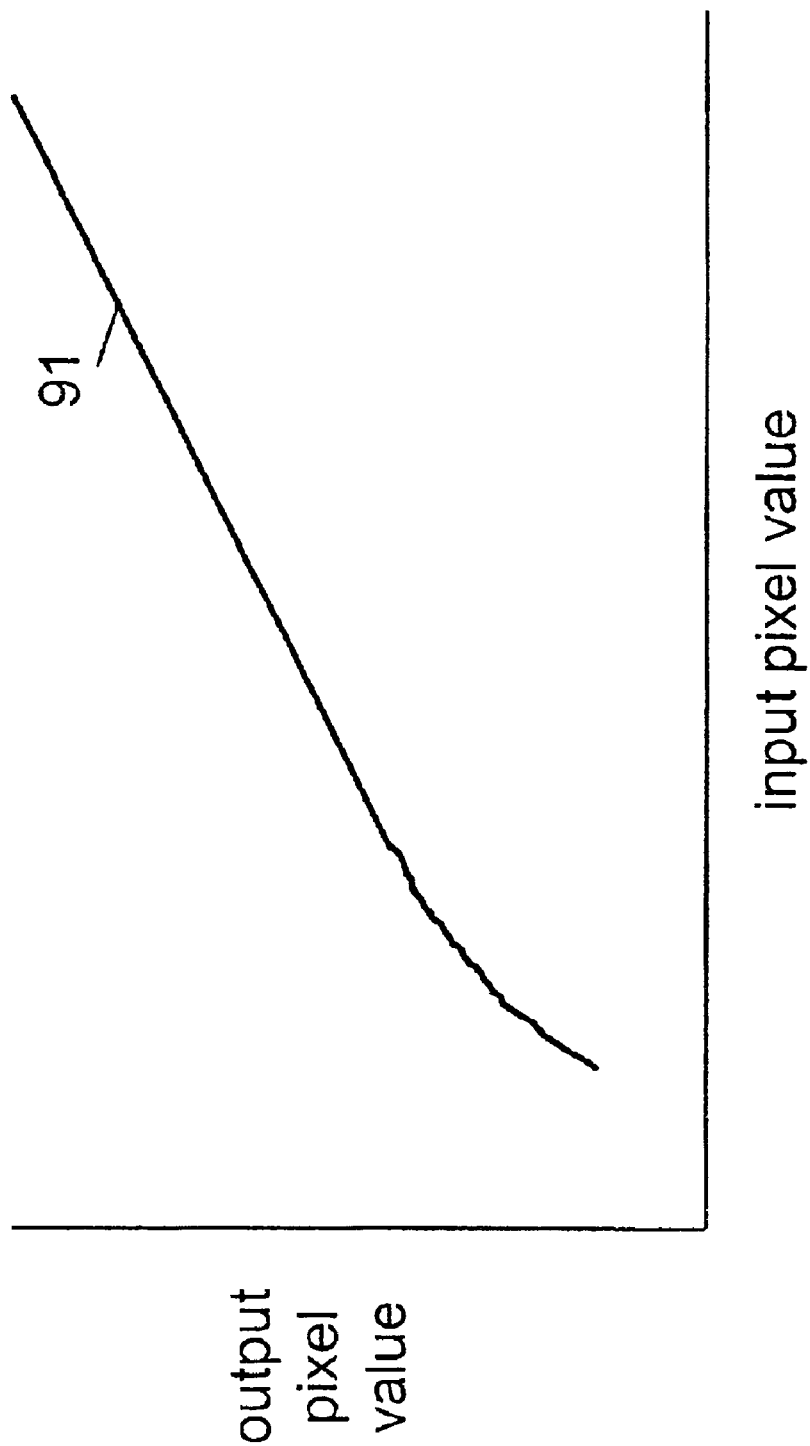
FIG. 15 shows an example plot of a tone scale function designed to compensate a digital image for the effects of the nonlinear response of a typical photographic film.
Figure 16:
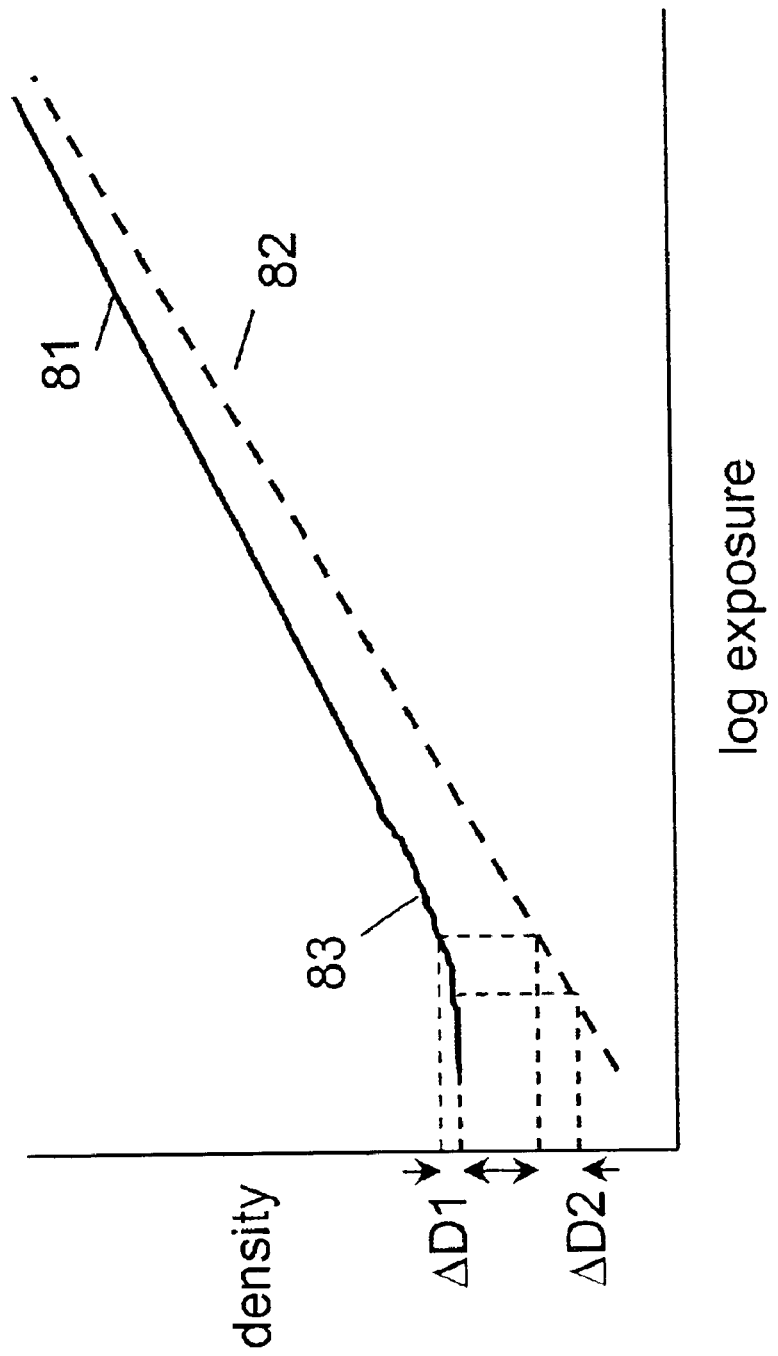
FIG. 16 is a graph illustrating the details of the construction method of the tone scale function and an example plot of a the nonlinear response of a typical photographic film.

The present invention uses the method disclosed by Goodwin in U.S. Pat. No. 5,134,573 to calculate the tone scale function. This tone scale function is designed to compensate for the non-linear under-exposure photo response of the photographic film from which the original digital image is derived. The tone scale function is implemented as a non-linear LUT, shown as 91 in FIG. 15, that is applied individually to the red, green, blue, pixel data. The photographic response for a typical photographic film (indicated by 81) as depicted in FIG. 16. It will be appreciated that the tone scale function shown in FIG. 15 has a characteristic slope that is greater than or equal to 1.0 for a significant portion of the function domain. Therefore, the processed digital images resulting from the application of the tone scale function shown in FIG. 15 will have an increase in contrast relative to the original digital image 101.

The method taught by Goodwin states that the linear sensitometric response range of digital images captured on photographic film can be increased by applying a LUT constructed using a mathematical formula intended to invert the natural sensitometric response of the photographic film. In particular, the slope corresponding to the under-exposure domain of a photographic film's standard density to log exposure (D-LogE) curve can be restored. Referring to FIG. 16, a density to log exposure curve for a typical photographic film is indicated by 81. A slope parameter $\phi$ describes the adjustment in slope which theoretically would result in the under-exposure portion of a photographic film sensitometric curve, and is given by (6)

$$\varphi = \frac{\Delta D2}{\Delta D1} \tag{6}$$

where $\Delta D1$ represents the density difference which would result in the actual film log exposure (indicated by 81) from two nearly equal exposures, and $\Delta D2$ represents the corresponding density difference which would result in the linearized log exposure curve (indicated by 82) from the same two exposures. The contrast parameter $\phi$ represents the contrast adjustment to be applied to a digital image at each density level. However, for the under-exposure portion of the log exposure curve (indicated by 83), as the slope approaches zero, $\Delta D1$ approaches zero and the slope adjustment will increase without limit, approaching infinity. If the tone scale curve produced with this method is applied directly to pixel data, the noise present in the pixel data will be amplified. An allowed maximum slope adjustment is specified by the parameter $\phi_{max}$. Thus, the tone scale function produced with Goodwin's method, when applied with the present invention, can be constructed with a higher maximum slope parameter. Slope adjustments below $\phi_{max}$ are gradually reduced to 1. In that case, the parameter $\phi$ is substituted by $\phi'$ given by (7)

$$\phi' = \phi \text{ if } \phi < \phi_{max} \tag{7}$$

$$\varphi' = 1 + \frac{A}{B + e^{(C\varphi - D)}} \quad \text{if } \varphi >= \varphi_{\max}$$

where A, B, C, and D are constants which depend upon the maximum slope adjustment. The amount of expected noise contained in the input digital image can affect the selection of optimal parameters A, B, C, D and $\phi_{max}$.

Alternatively, a less complex mathematical formula for slope adjustments below $\phi_{max}$ can be formulated. For the case of $\phi$ less than $\phi_{max}$, the contrast parameter $\phi$ is substituted by $\phi'$ given by a simple functional relationship (8):

$$\phi' = \phi \quad \text{if } \phi < \phi_{max} \tag{8}$$

$$\varphi' = 1 + \frac{\varphi_{\max} - 1}{K + (\varphi - \varphi_{\max})^2} \quad \text{if } \varphi >= \varphi_{\max}$$

where the parameter K establishes the rate of convergence of the function to a minimum value of 1.0. In the preferred embodiment of the present invention K is set equal to 0.5.

The photographic response to light is a characteristic of each manufactured photographic film product. However, photographic films of equivalent photographic speed, i.e. ISO rating, have similar response curves. The present invention groups photographic film products into ISO speed categories—one category for ISO 100, 200, 400, 800, below 100, and above 800. A representative photographic film product is selected for each of the ISO speed categories. For each selected photographic film product, the photo response is measured by photographing a reference film strip which includes gray, i.e. color neutral, patch targets that range in reflectance value. This is accomplished by analyzing the digital images derived from the reference film strip using the photographic film scanner. The tone scale function is generated from the measured data. The photographic film scanner is used to determine the ISO of the photographic film strip using the stored film type identification tags in the general control computer 40. The data base of sensitometric contrast transforms for each ISO speed type are stored in the general control computer 40. For each set of digital images processed, the photographic speed of the photographic film strip is identified and the corresponding s sensitometric contrast transform is selected.

The tone scale function is calculated by a numeric integration of the function (6) resulting in a LUT relating the measured density to the "linearized" density. A luminance signal response curve is calculated as the average response of the red, green, and blue pixels derived from the reference film strip data. The numerical integration must have a starting pixel value. The luminance minimum pixel value is used as the starting pixel value.

The tone scale function LUT is applied to the pixel data of the noise reduced digital image 102 in the following manner. First the corresponding color minimum pixel values $R_{min}$, $G_{min}$, and $B_{min}$ are measured from the photographic film strip by scanning a region of the photographic film strip that received no light. The resultant pixel values are averaged to produce robust values for the color minimum pixel values $R_{min}$, $G_{min}$, and $B_{min}$ corresponding to the red, green, and blue color pixels respectively. Then the tone scale function LUT represented as T[ ] is applied as given by (9)

$$R_i' = T[R_i - R_{min}] \tag{9}$$

$$G_i' = T[G_i - G_{min}]$$

$$B_i' = T[B_i - B_{min}]$$

where $R_i'$, $G_i'$ and $B_i'$ represent the transformed pixel values and $R_i$, $G_i$, and $B_i$ represent the pixel values of the final reconstructed digital image.

The photo response to light of some photographic film products is different for the red, green, and blue sensitive layers. In an alternative embodiment of the present invention, a separate component tone scale function is generated for the red, green, and blue digital image channels of the original digital image 101. These separate tone scale functions are applied individually to the pixels of the corresponding digital image channels of the noise reduced digital image 102. For this alternative embodiment of the present invention, the original digital image 101 includes a plurality of color channels and the tone scale function includes a component for each of the color channels.

The use of the present invention can be detected in a competitor's system through the use of specialized test imagery and subsequent analysis of the processed test imagery. A test photographic film strip containing multiple recorded images is prepared wherein the recorded images contain image content exposed with varying levels of light such that some of the individual images on the test photographic film strip are clearly underexposed, some are overexposed, some are properly exposed. The images that are properly exposed represent image content that is recorded within the linear response range of the photographic film material. The underexposed and overexposed images contain image content that is recorded within the non-linear response range of the photographic film material. Included in the test imagery are color neutral flat patch targets that are recorded with a nearly uniform density on the photographic film material. These color neutral patch targets are selected such that the regions of the photographic film strip corresponding to the color neutral flat patch targets have different densities. Thus the series of color neutral flat patch targets spans the useful range of achievable densities of the photographic film material.

The test photographic film strip is chemically processed with the competitor's system and inquiry photographic prints are generated. The chemically processed test photographic film strip is used with a system that has an implementation of the present invention and reference photographic prints are generated. The analysis starts by measuring, with a densitometer, the density of the image regions corresponding to the color neutral flat patch targets for the inquiry photographic prints and the reference photographic prints. The measured density values are compared patch for patch. If the density values for the two systems are substantially different, it is unlikely that the present invention was employed in the competitor's system to generate the inquiry photographic prints. If the density values are similar, then it is likely that the competitor's system is performing a tone scaling operation designed to linearize the effective response of the photographic film product.

Further analysis is needed to determine if the competitor's system is employing a spatial filter to apply the tone scale function that achieves the linearization effect. Next the photographic prints from both systems are scanned with a reflection print scanner and analysis digital images are generated corresponding to both sets of photographic prints. A Laplacian operation is performed on the analysis digital images leaving just the high spatial frequency components of noise. The standard deviation corresponding to color neutral flat patch targets is calculated and compared—system to system. If the standard deviation values are significantly higher for the competitor's system it is unlikely that a spatial filter has been used to apply the linearization tone scale function. However, if the standard deviation values are similar, it is likely that some form of spatial filter has been used in the competitor's system to control noise and it is possible that the present invention has been employed to achieve the results.

Still further analysis is performed to determine with greater precision if a spatial filter has been used to apply the linearization tone scale function. If a separate noise reduction filter has been used in the competitor's system to control noise and has been used in an independent manner from the application of the linearization tone scale function, the ratio of the standard deviation values for properly exposed to under or overexposed color neutral flat patch targets will be different than if the noise reduction filter were used to apply the linearization tone scale function. The ratios of standard deviation values are then calculated using the analysis digital images. If the ratios of standard deviation values are similar for the two systems, it is very likely that the present invention has been employed in the competitor's system to generate the inquiry photographic prints.

Most systems can be operated in a variety of different modes by turning on and off different combinations of features. This can complicate the detection method. The above test is repeated by configuring the competitor's system in as many modes as is practical and possible. The results are analyzed to find if any of the configurations test positive with the above described test procedure. For many configurations the analysis results can be negative even if the present invention has been employed by the competitor's system due to the fact that a variety of other system features can mask the effect of the present invention. However, it is very unlikely that a positive result can be obtained if the present invention has not been employed by the competitor's system. Similarly, most algorithm implementations have corresponding control parameters. Therefore the above described tests may need to be repeated using different combinations of algorithm control parameters.

The present invention can be provided in a computer program which is stored on a computer readable storage medium which produces the image pyramid representation and uses such representation to create a reconstructed digital image as discussed above. Such a medium can comprise for example; a magnetic disk (such as a floppy disk), magnetic tape, code bars, solid state electronic storage devices (such as random access memories or read only memories), or any other physical device or medium which can be employed to store a computer program.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 display device
60 input control device
70 offline memory device
81 log exposure curve
82 linearized log exposure curve
83 under-exposure portion of log exposure curve
91 non-linear LUT
101 original digital image
102 noise reduced digital image
103a base digital image
103b base digital image
103c base digital image
104a residual digital image
104b residual digital image
104c residual digital image
105a noise reduced base digital image
105b noise reduced base digital image
105c noise reduced base digital image
108 image pyramid representation
109 tone scale adjusted digital image
110 pyramid construction module
111 tone scale function
112 difference digital image
113 enhanced digital image
115 pyramid level generation module
120 pyramid reconstruction module
125 pyramid level regeneration module
130 tone scale function applicator
131 input base digital image
132 output base digital image
133 residual digital image
135 noise reduced base digital image
137 interpolated base digital image
138 interpolated residual digital image
139 interpolated noise reduced base digital image
140 interpolation module
142 residual filter module
144 residual interpolation module
150 difference module
160 addition module
170 noise reduction filter module
180 base filter module
201 pixel of interest
202 pixel location
203 pixel location

What is claimed is:

1. A method of processing a digital image to improve contrast, the digital image being derived from an image captured by a recording medium having a nonlinear response to light, comprising the steps of:
    a) applying a spatial filter to the digital image to produce a noise reduced digital image;
    b) subtracting the noise reduced digital image from the digital image to produce a difference digital image;
    c) applying a tone scale function to the noise reduced digital image to produce a tone scale adjusted digital image having the appearance of being derived from an image captured by a recording medium having a linear response; and
    d) combining the difference digital image with the tone scale adjusted digital image to produce a processed digital image, whereby the contrast of the digital image is improved without amplifying noise.

2. The method of claim 1, wherein the recording medium is photographic film.

3. The method of claim 1, wherein the step of combining includes the steps of scaling the difference digital image by a constant and adding the scaled difference digital image to the tone scale adjusted digital image.

4. The method of claim 1, wherein the step of applying a spatial filter to the digital image includes the steps of:
    generating a multiresolution digital image representation of the digital image including a plurality of base digital images and a plurality of residual digital images wherein:
        i) the base digital images are each of a different spatial resolution and are lower spatial resolution versions of the digital image;

ii) the residual digital images are each of a different spatial resolution and include spatial detail relating to a different pass-band of spatial frequencies; and applying the spatial filter to the multiresolution digital image representation to produce the noise reduced digital image.

5. The method of claim 4, wherein the spatial filter is applied only to one or more of the base digital images.

6. The method of claim 5, wherein the base and residual digital images are generated in sequence and recombined to produce the noise reduced digital image.

7. The method of claim 6, wherein the spatial filter is applied to the base image(s) as they are being generated.

8. The method of claim 6, wherein the spatial filter is applied to the base image(s) as they are being recombined.

9. The method of claim 4, wherein the base digital images are generated using a two-dimensional Gaussian filter.

10. The method of claim 4, wherein the base digital images are generated using a two orthogonal one-dimensional Gaussian filters.

11. The method of claim 4, wherein the residual digital images are generated using a bi-linear interpolation filter.

12. The method of claim 4, wherein the residual digital images are generated using a bi-cubic interpolation filter.

13. The method of claim 4, wherein the base digital images are generated using two orthogonal one-dimensional Gaussian filters and the residual digital images are generated by applying a bi-linear interpolation filter to a base digital image to generate an interpolated digital image and subtracting the interpolated digital image from a next higher resolution base digital image.

14. The method of claim 4, wherein wavelet filters are used to generate the multiresolution digital image representation of the digital image.

15. The method of claim 1, wherein the tone scale function is the mathematical inverse of the response to light function of the recording medium.

16. The method of claim 1, wherein the digital image is a color digital image having a plurality of color channels and the tone scale function is applied to all of the color channels.

17. The method of claim 1, wherein the digital image is a color digital image having a luminance channel and a plurality of chrominance channels and the tone scale function is applied to the luminance channel.

18. The method of claim 1, wherein the digital image is a color digital image having a plurality of color channels and the tone scale function includes a component for each of the color channels.

19. The method of claim 1, wherein the tone scale function has a characteristic slope that is greater than or equal to 1.0.

20. The method of claim 1, wherein the spatial filter is a median filter.

21. The method of claim 1, wherein the spatial filter is a sigma filter.

22. The method of claim 21, wherein the digital image is composed of pixels and the sigma filter comprises the steps of:

identifying a pixel of interest and a local neighborhood of pixels located about the pixel of interest from the digital image;

calculating a difference pixel value for pixels in the local neighborhood of pixels based on the absolute value difference between the value of the pixel of interest and the individual values of pixels included in the local neighborhood of pixels;

using the absolute difference pixel values to calculate a noise reduced pixel value; and replacing the value of the pixel of interest with the noise reduced pixel value.

23. The method of claim 22, further including the steps of:

comparing the absolute difference pixel values to a threshold value; and using only the values of pixels included in the local neighborhood of pixels for which the corresponding absolute difference pixel values are less than the threshold value to calculate the noise reduced pixel value.

24. The method of claim 23, wherein the threshold value is a function of the values of pixels included in the local neighborhood of pixels.

25. The method of claim 24, wherein the threshold value is related to the expected noise magnitude in the digital image.

26. The method of claim 25, wherein the threshold value is set to at least four times the expected noise magnitude in the digital image.

27. A computer program product for performing the method of claim 1.

28. Apparatus for processing a digital image to improve contrast, the digital image being derived from an image captured by a recording medium having a nonlinear response to light, comprising:

a) means for applying a spatial filter to the digital image to produce a noise reduced digital image;

b) means for subtracting the noise reduced digital image from the digital image to produce a difference digital image;

c) means for applying a tone scale function to the noise reduced digital image to produce a tone scale adjusted digital image having the appearance of being derived from an image captured by a recording medium having a linear response; and d) means for combining the difference digital image with the tone scale adjusted digital image to produce a processed digital image, whereby the a contrast of the digital image is improved without amplifying noise.

* * * * *